United States Patent
Polic

(10) Patent No.: US 10,503,143 B1
(45) Date of Patent: Dec. 10, 2019

(54) PROTECTION SYSTEM FOR MULTI-ZONE ROBOTIC AREA

(71) Applicant: Amazon Technologies, Inc., Seattle, WA (US)

(72) Inventor: Dennis Polic, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/946,671

(22) Filed: Apr. 5, 2018

(51) Int. Cl.
| | |
|---|---|
| *G05B 19/045* | (2006.01) |
| *G05B 19/048* | (2006.01) |
| *G05B 19/406* | (2006.01) |
| *B65G 1/137* | (2006.01) |
| *B25J 9/16* | (2006.01) |
| *B65G 1/04* | (2006.01) |
| *G05B 19/042* | (2006.01) |

(52) U.S. Cl.
CPC .......... *G05B 19/406* (2013.01); *B25J 9/1676* (2013.01); *B25J 9/1697* (2013.01); *B65G 1/0492* (2013.01); *B65G 1/1378* (2013.01); *G05B 19/045* (2013.01); *G05B 19/048* (2013.01); *G05B 19/0425* (2013.01); *Y10S 901/09* (2013.01); *Y10S 901/31* (2013.01)

(58) Field of Classification Search
CPC .................................................. G05B 19/048
See application file for complete search history.

(56) References Cited

U.S. PATENT DOCUMENTS

| | | | |
|---|---|---|---|
| 8,280,547 B2 | 10/2012 | D'Andrea et al. | |
| 9,087,314 B2 | 7/2015 | Hoffman et al. | |
| 9,492,923 B2 | 11/2016 | Wellman et al. | |
| 9,561,587 B2 | 2/2017 | Wellman et al. | |
| 9,733,646 B1* | 8/2017 | Nusser | B65G 1/137 |
| 2013/0197694 A1* | 8/2013 | Harada | G01J 1/02 700/254 |
| 2013/0233044 A1* | 9/2013 | Arth | G05B 9/03 73/1.01 |
| 2015/0316909 A1* | 11/2015 | Govindaraj | G05B 15/02 700/19 |
| 2016/0207198 A1* | 7/2016 | Willfor | G05B 19/4061 |
| 2016/0252891 A1* | 9/2016 | Hutt | G05B 19/0423 700/83 |
| 2016/0260328 A1* | 9/2016 | Mishra | G08G 1/163 |
| 2017/0157783 A1* | 6/2017 | Ogawa | B25J 19/06 |
| 2017/0261962 A1* | 9/2017 | Naitou | G05B 19/4061 |
| 2019/0018382 A1* | 1/2019 | Elkmann | G05B 19/048 |
| 2019/0084158 A1* | 3/2019 | Atherton | B25J 9/1676 |

* cited by examiner

*Primary Examiner* — Thomas Randazzo

(74) *Attorney, Agent, or Firm* — Kilpatrick Townsend & Stockton LLP

(57) ABSTRACT

Techniques described herein define a protection system for a multi-zone area where mobile drive units operate autonomously. For example, the protection system may receive sensor data in a particular detection space where the mobile drive units and potentially human operators enter and exit around a robotic arm. The sensor data may identify that an object has entered the detection space around the robotic arm. The sensor data may identify the likelihood of a mobile drive unit entering the area as compared to an operator entering the area. When the object is identified as an operator, any movement of the robotic arm may immediately stop. When the object is identified as the mobile drive unit, protection rules meant to protect the operator may be deactivated so that the mobile drive unit may receive inventory from the robotic arm.

20 Claims, 18 Drawing Sheets

US 10,503,143 B1

PROTECTION SYSTEM FOR MULTI-ZONE ROBOTIC AREA

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space and equipment, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

Maintenance and other operations involving modern inventory can require interactions between operators and automated equipment. Operators may directly interact with some automated equipment but, under some conditions, it may not be permissible to interact with a variety of othr automated equipment. Accounting for a variety of interactions and conditions can present challenges for many inventory systems.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to defining a protection system for a multi-zone area where mobile drive units operate autonomously. For example, the protection system may include an inventory system that includes one or more mobile drive units, a robotic arm configured to pack and stow items into an inventory holder that is moved by the mobile drive units, a plurality of sensors affixed with the robotic arm, and a management module that is configured to communicate with each of the devices and systems. The protection system incorporated with the inventory system may receive sensor data in a particular detection space where the mobile drive units and/or operators enter and exit around the robotic arm. The sensor data may identify that an object has entered the detection space around the robotic arm. The sensor data may identify the likelihood of a mobile drive unit entering the detection space as compared to a an operator entering the detection space. When the object is identified as the operator, any movement of the robotic arm may immediately stop. When the object is identified as the mobile drive unit, protection rules meant to protect the operator may be deactivated so that the mobile drive unit may receive inventory from the robotic arm.

In accordance with an embodiment, an operator may walk towards a robotic arm in a fulfillment center. A pair of sensors mounted adjacent to or affixed with the robotic arm may identify that the operator is walking towards the robotic arm and cease all operations. The identification of the operator may be based on sensor data that compares the data received by the sensors with width and height specifications of a mobile drive unit and/or inventory holder that the mobile drive unit may customarily carry around the inventory system in conjunction with the robotic arm. In another example, when the sensor data receives an indication that identifies the mobile drive unit and/or the inventory holder approaching the robotic arm, the robotic arm may continue to operate in order to provide items to the inventory holder that is being moved by the mobile drive unit.

Figure 1:
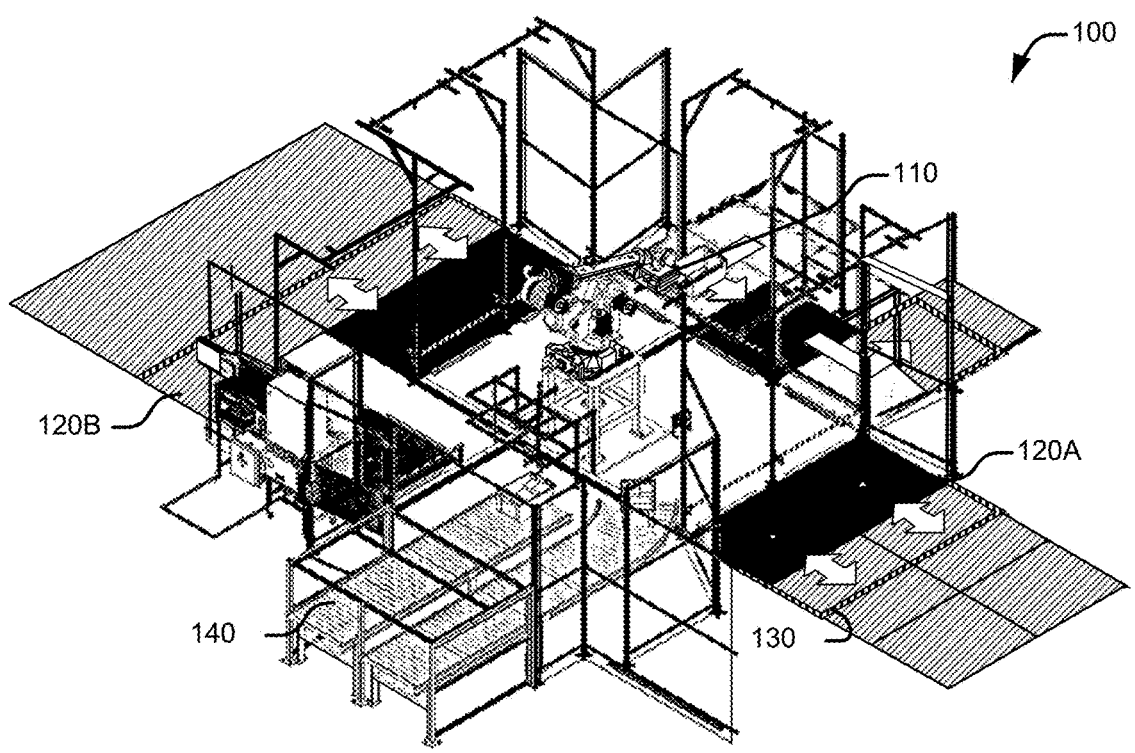
FIG. 1 illustrates an example of a robotic arm and a detection area, according to at least one embodiment of the disclosure.

FIG. 1 illustrates an example of a robotic arm and a detection area, according to at least one embodiment of the disclosure. In illustration 100, a robotic arm 110 is illustrated adjacent to a detection space 120 (illustrated as 120A and 120B). An area 130, identified by striped tape on a surface of the fulfillment center, may also be identified around the robotic arm 110.

During operation of the system, an operator may approach the robotic arm 110 within and outside of the detection space 120. In some embodiments, the operator may not directly interact with the robotic arm 110. The operator may identify area 130 as a limit to where the operator may access. When an operator accesses an area within the area 130, the robotic arm 110 may stop movement or reduce a speed of the movement. In some examples, the operator may access the area 130 when the operator requests access (e.g., via a user interface that is communicatively coupled with the robotic arm 110 via a management module and network, etc.).

During operation of the system, one or more mobile drive units may also approach the robotic arm 110 within and outside of the detection space 120. The mobile drive units may move along a surface of the fulfillment center toward the robotic arm 110 or away from the robotic arm 110. The movement of the mobile drive units may approach the robotic arm 110 in a first zone, moving laterally to the robotic arm in a second zone, and moving away from the robotic arm in a third zone.

In some embodiments, the mobile drive unit may engage with an inventory holder and move the inventory holder closer to the robotic arm 110. For example, when approaching the robotic arm 110, the inventory holder may include an available space to accept a new item. When the mobile drive unit and inventory holder are within a proximate distance of the robotic arm 110, the robotic arm 110 may place an item from a conveyor belt 140 into the available space in the inventory holder. The mobile drive unit may move the inventory holder away from the robotic arm 110 to another location (e.g., identified by a management module, or autonomously determined by the mobile drive unit, etc.).

Figure 2:
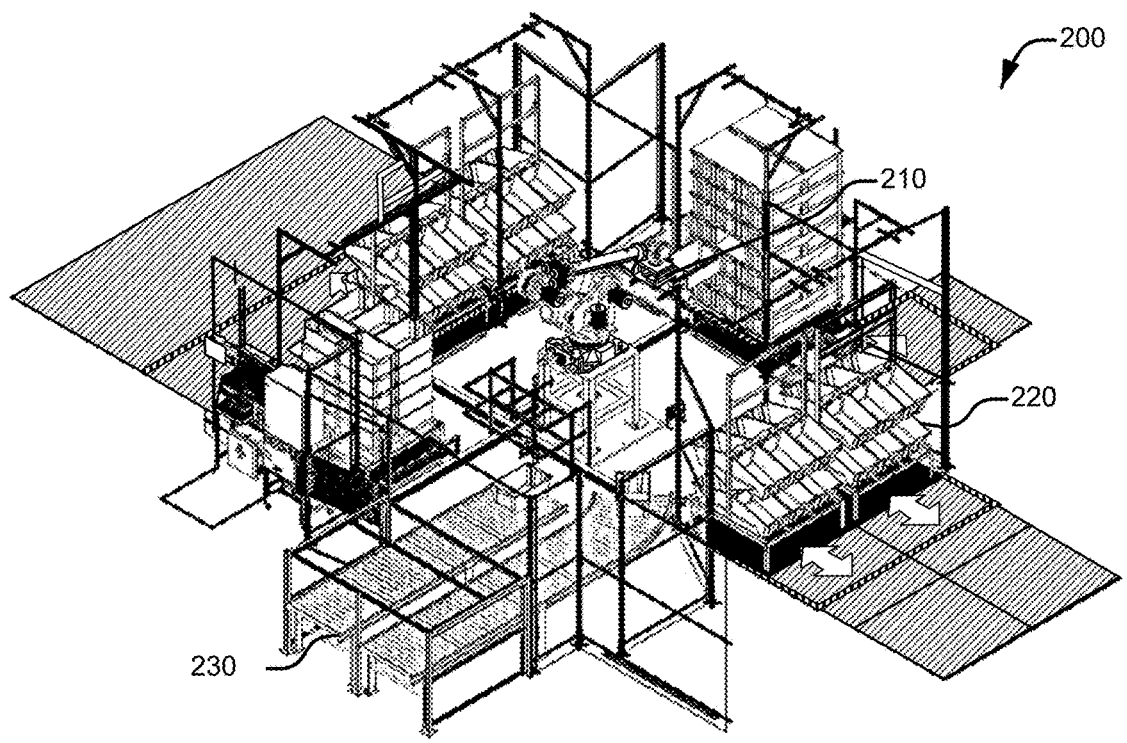
FIG. 2 illustrates an example of a robotic arm, inventory holders, and a detection area, according to at least one embodiment of the disclosure.

FIG. 2 illustrates an example of a robotic arm, inventory holders, and a detection area, according to at least one embodiment of the disclosure. In illustration 200, a robotic arm 210 is illustrated adjacent to a plurality of inventory holders 220 and a conveyor belt 230.

Items may be transported on the conveyor belt 230 toward the robotic arm 210 or transported away from the robotic arm 210. The robotic arm 210 may maneuver to pick up the item from the conveyor belt 230 and place the item into inventory holder 220. The inventory holder 220 may store the item. The item may also be moved when a mobile drive unit moves one of the inventory holders 220 from the detection area to another location in the fulfillment center. In another example, the items may be transported on the conveyor belt 230 away from the robotic arm 210. The robotic arm 210 may maneuver to pick up the item from the inventory holder 220. The robotic arm 210 may move the item from the inventory holders 220 to the conveyor belt 230. The detection space of FIG. 2 may be further illustrated with FIG. 3.

Figure 3:
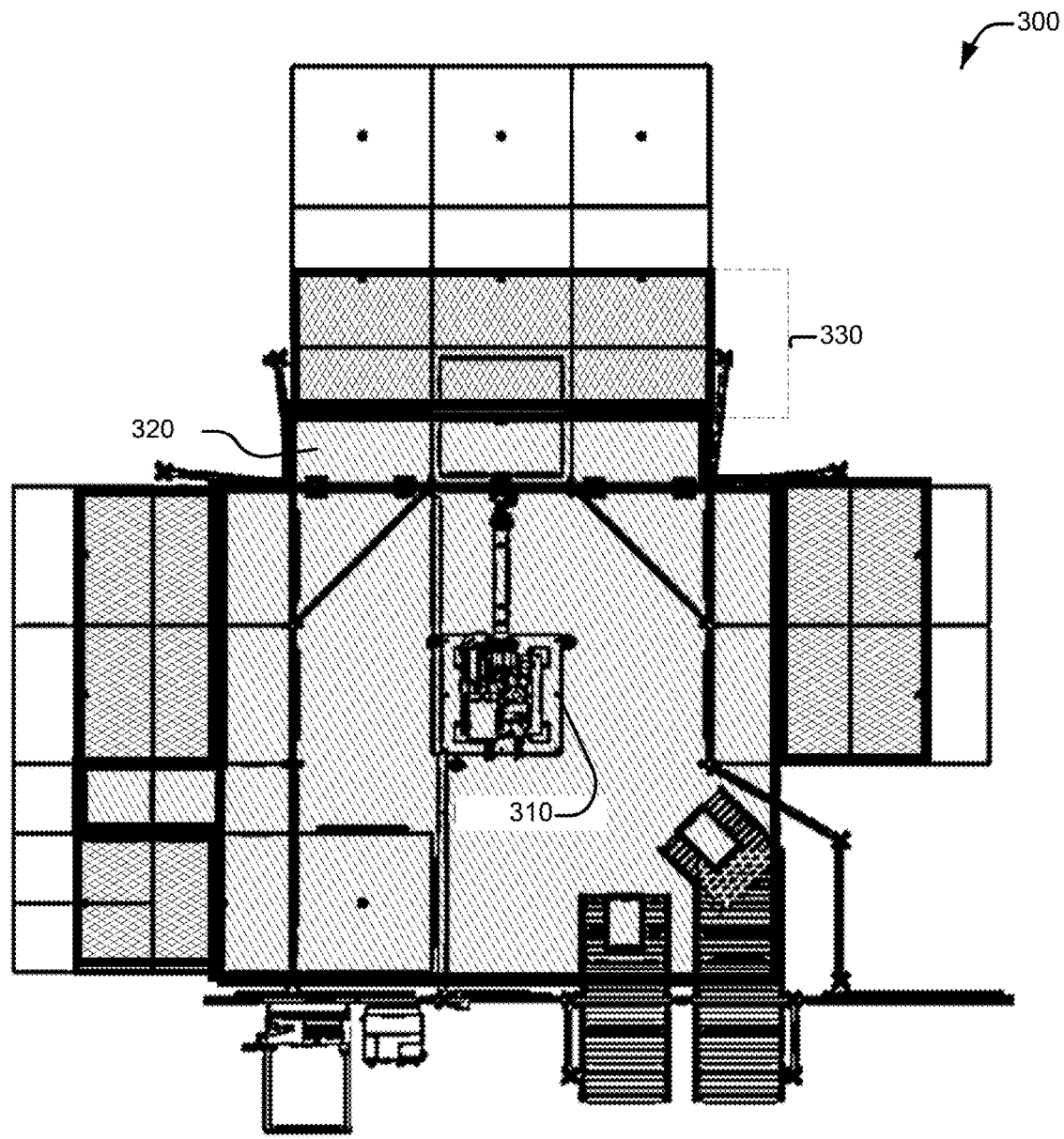
FIG. 3 illustrates an example of a detection area, according to at least one embodiment of the disclosure.

FIG. 3 illustrates an example of a detection area, according to at least one embodiment of the disclosure. In illustration 300, the robotic arm 310 may operate within the area 320. The operator may be instructed to remain at a distance 330 from the robotic arm 310. The detection space at least within the distance 330 may comprise a detection space 120.

The robotic arm 310 may stop movement or reduce a speed of the movement when an operator approaches the robotic arm according to a safety distance calculation. For example:

$$S=(K \times T)+C,$$

where S is the safety distance, K is the approach speed of a person (e.g., 1600 mm/s), T may include several components, and C is a constant that may correspond with a horizontal direction scanning of the safety sensor, 1200 mm—0.4× the height of one or more of the sensors (e.g., 203 mm). The components of T may correspond with, as a sample illustration, t1 as a photoelectric or Keyence laser scanning safety sensor response time 84 ms, t2 as an Allen Bradley input module response time 40 ms, t3 as an Allen Bradley PLC module response time 20 ms, t4 as an Allen Bradley Output module response time 60 ms, t5 as a Phoenix Contact Safety Relay response time 10 ms.

FIGS. 1-3 may illustrate typical movements of the robotic arm 110 with respect to the detection space that could include the operator, mobile drive unit, and inventory holder. With the movement of the robotic arm 110, the robotic arm 110 is potentially harmful for the operators that may also access the robotic arm 110 within a proximate distance. For example, when the operator approaches the robotic arm 110 and enters the area 130, the robotic arm 110 may move, either expectedly or unexpectedly. Other systems that protect the robotic arm 110 with a fence or other physical barrier. These fences or physical barriers alone may be insufficient, since a mobile drive unit and inventory holder will also access the detection space 120 around the robotic arm 110. While any physical barrier may identify a physical, hazardous space to avoid around the robotic arm 110, the physical barrier may hinder throughput of the system by blocking the mobile drive units and inventory holders from accessing a space adjacent to the robotic arm 110. As such, some embodiments of the present disclosure may implement no fencing around the robotic arm or an incomplete fencing barrier (e.g., a fence with a gap, etc.) around the robotic arm 110.

In some examples, the distance calculation may correspond with protection rules to determine when to stop movement or reduce a speed of the movement of the robotic arm. When activated, protection rules may stop movement or reduce a speed of the movement of the robotic arm. The protection rules may include, for example, a predefined standardization on safety of machinery and/or may incorporate the speed of the operator as they approach the robotic arm 110. This may include the International Organization for Standardization (ISO) 13855, which identifies the positioning of safeguards with respect to the approach speeds of parts of the human body and may provide a methodology to determine the minimum distances to a hazard zone from the detection zone or from actuating devices of safeguards. The standardization on safety of machinery according to ISO 13855 may be incorporated by reference in its entirety for all purposes.

To identify the proximity and objects that approach the robotic arm within the detection space, embodiments of the disclosure may incorporate one or more sensors with the system. These sensors may help protect the operator that is accessing a detection space stopping any movement of the robotic arm while the operator is within a proximate distance of the robotic arm. The sensors may identify width and/or height specifications of objects within the proximate distance of the robotic arm by comparing sensor data from the sensors with known width and/or height specifications of other devices operable in the fulfillment center. When the comparison of the specification of the object identifies that the object approaching the robotic arm is a mobile drive unit or inventory holder (e.g., when the height of both specifications match or when the width of both specifications match, etc.), the robotic arm may continue operation. When the comparison identifies that the object approaching the robotic arm is an operator (e.g., when the height or width of both specifications do not match the specification of a mobile drive unit and/or inventory holder, etc.), the robotic arm may stop operation (e.g., the system may assume that the approaching object is an operator, etc.).

In some examples, the specification of an inventory holder may be unique when compared with an operator specification. For example, width and height of an operator may never correspond with a height of fifteen (15) inches (e.g., corresponding with the height of the legs to the base of the inventory holder) and/or a width of forty-six (46) inches (e.g., corresponding with the distance between two legs of the inventory holder). When the width or height of the inventory holder is changed, the new width or height of the inventory holder may be maintained to avoid corresponding with an operator specification (e.g., the inventory holder height or width may not correspond with an operator height or an operator width). In another example, a height of a top of an inventory holder may never correspond with an operator height (e.g., an operator is not greater than eight feet tall, etc.).

This toggling of activation of the robotic arm may also help maintain or increase throughput of the system by avoiding physical barriers to the detection area around the robotic arm. An illustration of the sensors that generate the sensor data is provided with FIG. 4.

Figure 4:
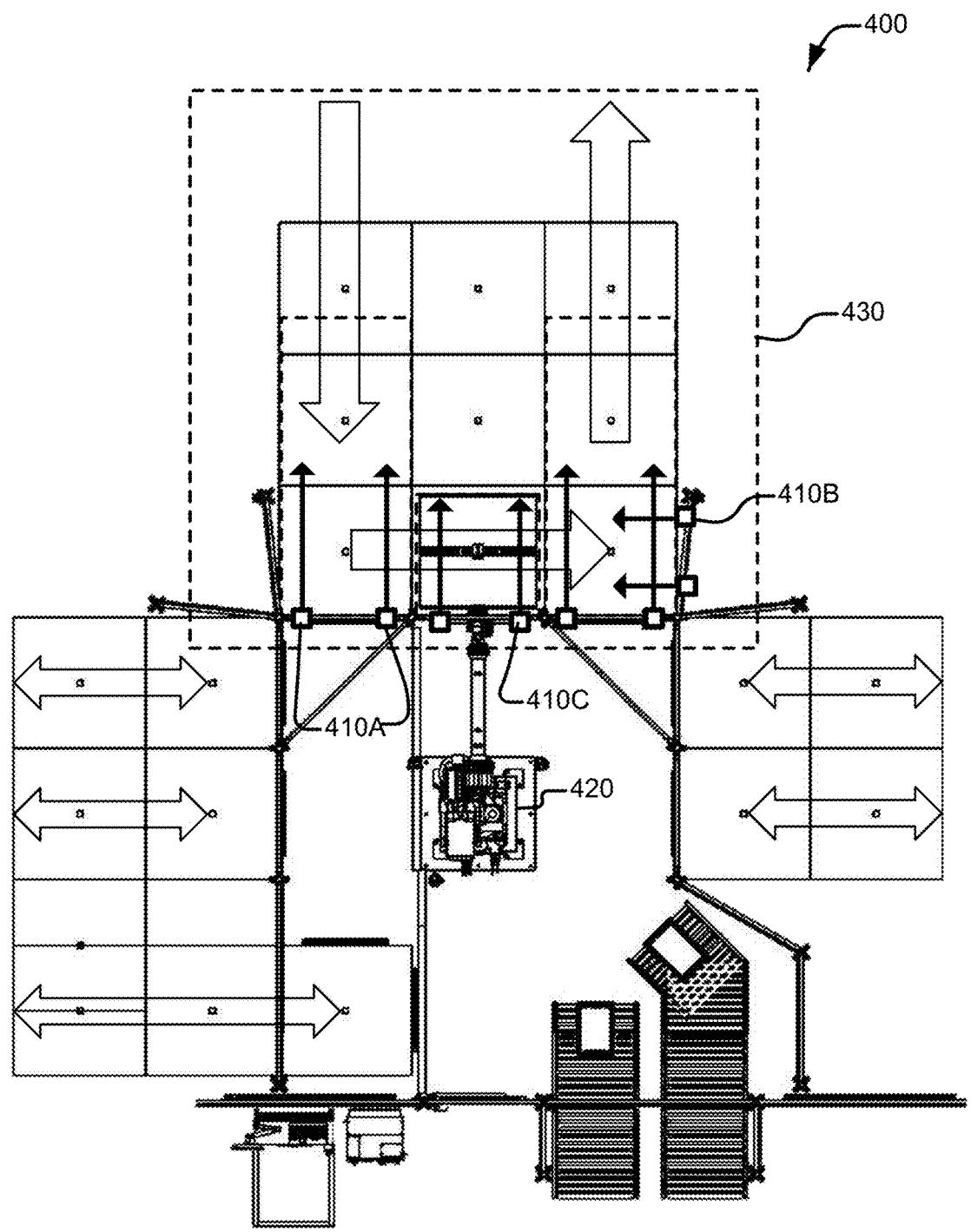
FIG. 4 illustrates example movements of mobile drive units within a detection area, according to at least one embodiment of the disclosure.

FIG. 4 illustrates example movements of mobile drive units within a detection area, according to at least one embodiment of the disclosure. In illustration 400, a plurality of sensors 410 (illustrated as 410A, 410B, 410C) may be mounted in association with or affixed to the robotic arm 420 and within the detection space adjacent to the robotic arm 420. The physical placement of the sensors may correspond with the specifications of the mobile drive unit and/or inventory holder and, in some examples, may be moved and affixed to a different location corresponding with a new height or new width of the mobile drive unit and/or inventory holder when the height or width changes.

The plurality of sensors 410 may include at least one laser scanning sensor (e.g., a Keyence laser scanning sensor) or distance sensor. The sensor may include a safety rated, safety laser scanner (e.g., SZ-V area scanning laser, etc.) to detect when an operator enters the detection space and consequently stops the robotic arm. Once the sensor signal to stop movement or reduce a speed of the movement has been actuated, a programmable automation controller or programmable logic controller (PLC) may input, process, and output the safety signal to a safety relay to the robotic arm controller.

The distance sensor, in some examples, may measure a distance in a two- or three-dimensional plane. For example, in a two-dimensional plane, the distance sensor may shine a beam of light on a horizontal plane from a mount point adjacent to the robotic arm and toward the detection space (e.g., a light curtain). The horizontal plane may be parallel to the surface of the floor of a fulfillment center in an inventory system. This may produce a large, invisible sheet of light at a predetermined distance from the surface of the floor (e.g., eight inches, fifteen inches, etc.) in association with the detection space. Any object that interacts with the sheet of light produced by the laser scanning sensor may be detected as sensor data and may cause a break in the light curtain. In a three-dimensional plane, the distance sensor may measure a distance between the sensor and an object within the area (e.g., that may be continuously measured, etc.).

Sensor data may include, for example, an indication that an object breaks a light curtain emitted by one or more sensors. Sensor data may also include a time associated with the identification of the object, a distance measurement between the object and the sensor, the distance measurement over time as the object moves closer to or farther away from the sensor, and/or the identification of the object itself (e.g., comparing the points of the light curtain with a specification of various objects, including a mobile drive unit or inventory holder width and height, etc.). In some examples, the sensor data may include a first location of an object at a first time and a second location of the same object at a second time. The sensor data may be compared to identify that, for example, the object is moving from the first location to the second location. Operations of the robotic arm may be adjusted based at least on the sensor data and/or analysis associated with the sensor data. Additional examples of sensor data and data analysis are provided with FIGS. 6-9.

In some examples, the plurality of sensors 410 may include a laser distance sensor. The laser distance sensor may project a narrow beam of light from a mount point adjacent to the robotic arm and toward the detection space. The laser distance sensor can measure the distance between the object that is obstructing the beam of light and the sensor. The distance measurement may also be stored as sensor data.

In some examples, the placement of at least some of the plurality of sensors 410 may correspond with specifications of a mobile drive unit and/or inventory holder that operate within a fulfillment center of an inventory system. For example, a base of an inventory holder may be measured at a distance of fifteen (15) inches above the ground and the distance between the legs of the inventory holder may be forty-six (46) inches. At least some of the plurality of sensors 410 may be placed to measure an incoming object at fifteen (15) inches above the ground. The object may interrupt the beam of light at least at two places (e.g., corresponding with two legs of the inventory holder that face the sensor) and that simultaneously move together at forty-six (46) inches apart. The inventory holder or mobile drive unit may vary in height or width without diverting from the scope of the disclosure, including the distance between the floor and the base of the inventory holder (e.g., the base being just above the top of the legs of the inventory holder). In these instances, the positions of the sensors may be moved and affixed to correspond with the inventory holder height and width as well. The movement of the inventory holder toward the plurality of sensors 410 may be operated by the mobile drive unit carrying the inventory holder in the detection space. Additional detail regarding the specifications of the inventory holder and/or mobile drive unit are provided with FIGS. 10-16.

The plurality of sensors 410 may include at least one muting sensor. For example, the muting sensor may comprise a temporary and automatic suspension of a safety function due a non-hazardous portion of the movement of the mobile drive unit. As a sample illustration, a light curtain may be muted to ignore the safety function of the light curtain. In another example, sensor data received from the photoelectric sensor may be muted to ignore approaching objects to the robotic arm. In some examples, the muting may be activated when the system determines that the approaching object is a mobile drive unit or behaves in an expected pattern of the a mobile drive unit carrying an inventory holder.

The plurality of sensors 410 may include one or more pairs of sensors, as illustrated with 410A. The sensors may be of the same type (e.g., receiving redundant data for a detection space) or of different types (e.g., receiving different sensor data for a detection space). When either embodiment is implemented, the sensors may be directed to point substantially horizontal outward with respect to the robotic arm.

For example, the pair of sensors may receive redundant and/or identical data by surveying a similar detection space. This may help ensure that at least one sensor is receiving sensor data at the time when the other sensor in the pair of sensors becomes inoperative or otherwise malfunctions. In some examples, the pair of sensors may include a first sensor and a second sensor, and the first sensor is active while the second sensor is inactive. The pair of sensors may operate asynchronously or toggle activation with respect to each other. In some examples, the sensors may be located in parallel with respect to the floor or the robotic arm.

The plurality of sensors 410 may include different types of sensors. These different types of sensors may correspond with the types of sensors discussed throughout the disclosure. In some examples, at least one of the sensors may correspond with distance measurement using a time of flight measurement or reflection measurement. In some examples, at least one of the sensors may correspond with sound measurement or echolocation.

As an illustration of the operation of the pair of sensors, the pair of laser scanning sensors or the pair of laser distance sensors may detect an object approaching the sensor when the object breaks a light curtain projected by the sensor. The sensor data may be analyzed to determine that the object is a mobile drive unit and not an operator. Upon this determination, the detection space may be muted by a second pair of sensors, the muting sensors, when the object interacts with the light curtain. The pair of sensors may be used in accordance in an International Electrotechnical Commission (IEC) safety standard (e.g., IEC 62046), which is incorporated by reference in its entirety for all purposes. This may allow dual asynchronous muting of a sensor zone that covers the detection area and part of the hazardous area. Muting of a portion of the detection zone may allow mobile drive unit to access the detection space. Once the mobile drive unit is in place in front of the robotic arm, the physical obstruction that the mobile drive unit may further protect the operator from the hazardous area around the robotic arm.

Figure 5:
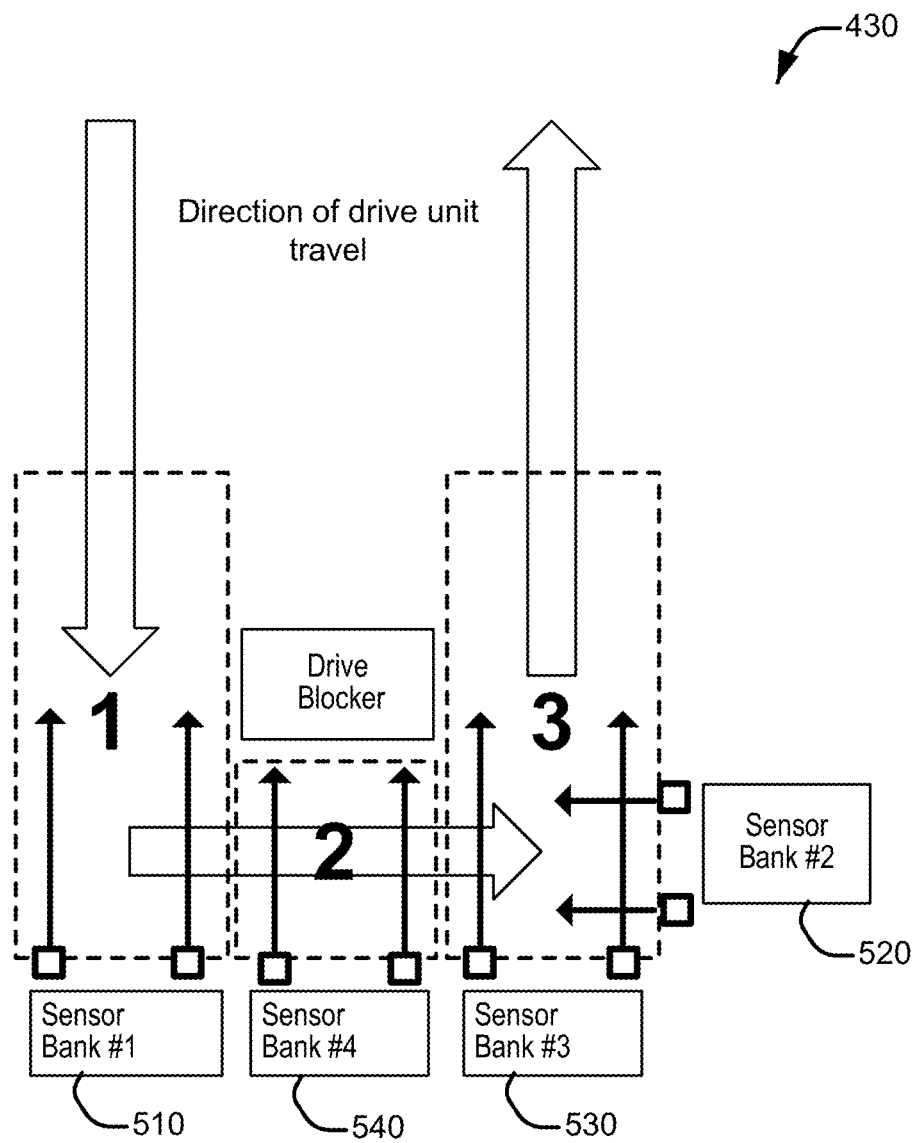
FIG. 5 illustrates example sensors within a detection area, according to at least one embodiment of the disclosure.

FIG. 5 illustrates additional detail of the sensors within a detection area, according to at least one embodiment of the disclosure. For example, in illustration 430 of FIG. 4 which is shown in additional detail in FIG. 5, the mobile drive unit that carries an inventory holder may enter the detection space in a first zone, labeled as "1" in illustration 430. Sensor bank one 510 may comprise two input sensors and one output sensor. For example, sensor bank one 510 may comprise a pair of laser scanning sensors that project the beam of light horizontally towards the oncoming mobile drive unit. The output may correspond with a muting active. When the mobile drive unit breaks the beam of light projected by one or more sensors in sensor bank one 510, the identification of the object breaking the beam of light may be recorded as sensor data. In some examples, the mobile drive unit may enter the first zone corresponding with the detection space as the mobile drive unit continues to move toward sensor bank one 510 (e.g., within a threshold distance from sensor bank one 510).

As the mobile drive unit continues to move toward sensor bank one 510, the decreasing distance between the mobile drive unit and sensor bank one 510 may also be recorded as sensor data. The mobile drive unit may cease forward motion toward sensor bank one 510 and begin a lateral motion towards sensor bank two 520. The mobile drive unit may break the beam of light projected by one or more sensors in sensor bank two 520 while the mobile drive unit remains in the first zone and continue to break the beam of light projected by one or more sensors in sensor bank two 520 as the mobile drive unit continues the lateral movement.

When the mobile drive unit begins the lateral motion towards sensor bank two 520, the mobile drive unit may enter the second zone, labeled as "2" in illustration 430. The mobile drive unit may again break the beam of light, this time projected by one or more sensors in sensor bank four 540. The lateral movement and decreasing distance between the mobile drive unit and sensor bank two 520 may be recorded as sensor data. With continued lateral movement toward sensor bank two 520, the mobile drive unit may break the beam of light projected by one or more sensors of sensor bank three 530 when entering the third zone, labeled as "3" in illustration 430. At this point of the illustration, the mobile drive unit may at least partially occupy the second zone and the third zone.

The mobile drive unit may fully enter the third zone and cease lateral movement toward sensor bank two 520. The mobile drive unit may begin movement away from sensor bank three 530 within the third zone. The increasing distance between the mobile drive unit and sensor bank three 530 may be recorded as sensor data. In some examples, the mobile drive unit may exit the third zone corresponding with the detection space as the mobile drive unit continues to move away from sensor bank three 530 (e.g., within a threshold distance from sensor bank three 530).

With each of the entrances and exits of the plurality of zones (e.g., the first zone labeled "1," the second zone labeled "2," and the third zone labeled "3"), protection rules may be activated and deactivated for the detection space based on the object detected by the sensor data. For example, when the sensor data identifies the object as the mobile drive unit and/or a mobile drive unit carrying an inventory holder, protection rules may be deactivated for the zone occupied by the mobile drive unit so that the mobile drive unit may operate in the zone in conjunction with the operation of the robotic arm. When the sensor data identifies the object as a an operator, protection rules may remain activated for the zone occupied by the human operator and/or all other zones. This may include stopping movement of the robotic arm altogether.

Figure 6:
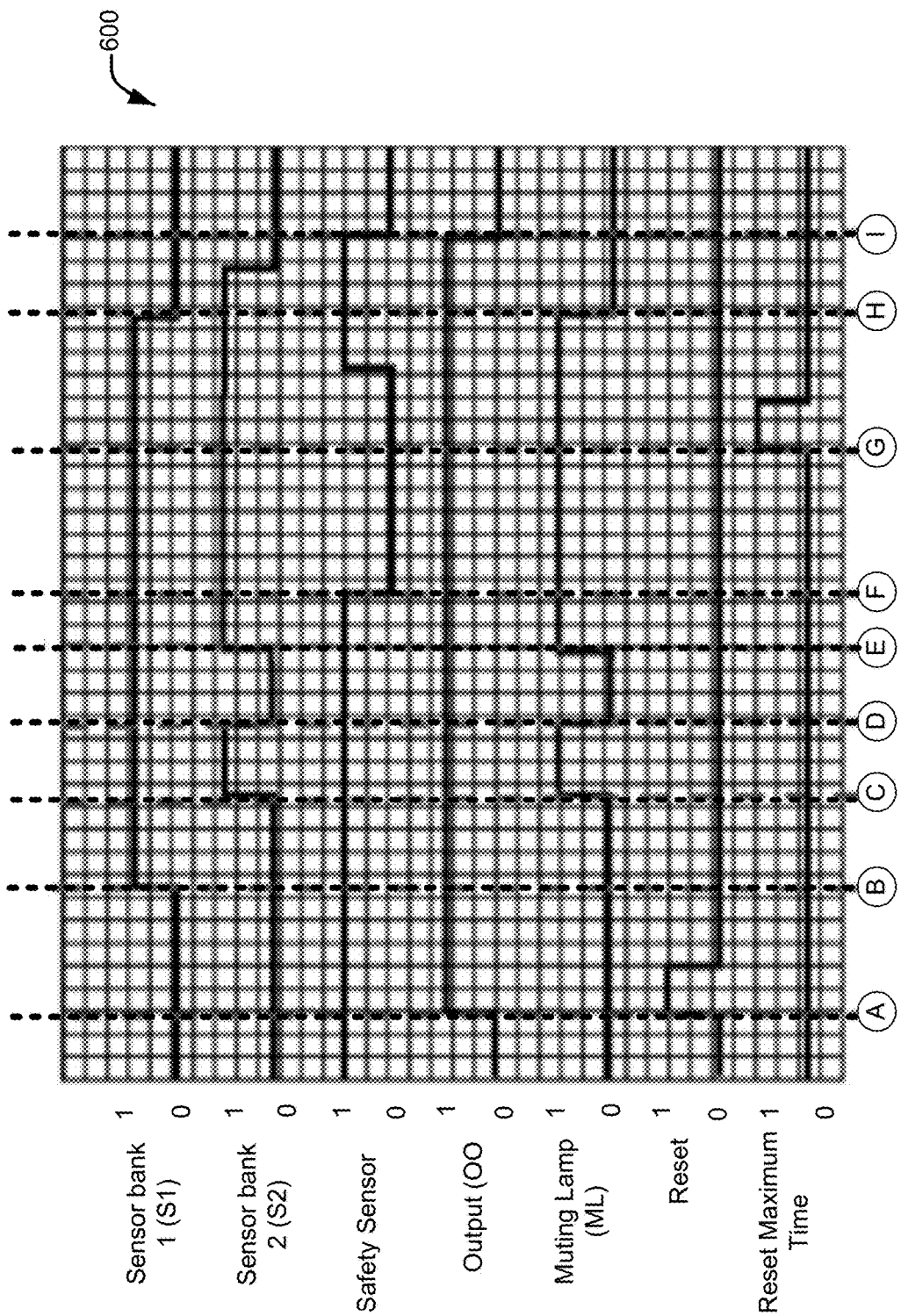
FIG. 6 illustrates a sensor timing chart, according to at least one embodiment of the disclosure.

FIG. 6 illustrates a sensor timing chart, according to at least one embodiment of the disclosure. Each sensor bank illustrated in FIG. 5 may correspond with a sensor timing chart. In illustration 600, the timing of at least some of the plurality of sensors is provided. For example, a muting sensor may be affixed at a height of a structure. The height of the muting sensor may correspond with the height of the bottom of the inventory holder as it is being engaged by the mobile drive unit. The sensors may be time of flight (ToF) distance triggered. As the mobile drive unit enters the area with the inventory holder, the muting sensor may be triggered by the distance of the moving mobile drive unit in a recognizable pattern within a specified amount of time. This sequence may then trigger a second set of sensors of the plurality of sensors (e.g., a photoelectric sensor, a laser scanning sensor, etc.) to allow the mobile drive unit to approach the robotic arm without stopping a normal operation of the robotic arm.

In another example, illustration 600 may describe a two sensor light curtain muting add-on-instruction (AOI) that operates on a control system that use a common control engine with a common development environment to provide repeatable, high performance across several automation systems. This AOI may perform the function of muting a light curtain or other safety area protection sensor using two sensors to detect material passing into or out of a hazardous area.

As a sample illustration, two muting sensors are mounted in the method appropriate for the application such that when the material enters or exits the detection area, the muting sensors are triggered by the distance of the moving material in a recognizable pattern within a specified amount of time. This sequence of sensor triggering in a recognizable pattern then activates the muting feature of the safety protection sensor to allow the material to enter or exit the detection area.

The two sensors may be separated horizontally by forty-six (46) inches and mounted at the height of fifteen-and-a-half (15½) inches from the ground. These sensors may be aimed at the bottom of the inventory holder. The sensors may be time of flight (ToF) distance triggered with triggering distances appropriate for the disclosure. As the mobile drive unit carrying an inventory holder enters the area, the muting sensors may be triggered by the distance of the moving pod in a recognizable pattern within a specified amount of time. This sequence may then trigger the laser distance sensor to change the detection zone and allow the drive unit and inventory holder to approach the detection area with the robotic arm without stopping the normal operation of the robotic arm comprising the detection and/or potentially hazardous area.

The illustration 600 may illustrate operations of a plurality of sensors. For example, at time A, the system may be reset after a power on condition. At time B, sensor 1 may become active and a $T_{S1S2}$ time measurement is started. At time C, sensor 2 may become active within $T_{S1S2}$ time enabling the muting function. $T_{S1S2}$ time measurement may be stopped. $T_{MAX}$ time measurement may be started. At time D, sensor 2 may become inactive disabling the muting function. $T_{S1S2}$ time measurement may be started. $T_{MAX}$ time measurement may be stopped. At time E, sensor 2 may become active within $T_{S1S2}$ time enabling the muting function. $T_{S1S2}$ time measurement may be stopped. $T_{MAX}$ time measurement may be started. At time F, the safety sensor input may become inactive (e.g., due to the material moving into or output the hazard area) but may be ignored by the muting function. At time G, the Reset Maximum Time input may become active, resetting the $T_{MAX}$ time. At time H, sensor 1 may become inactive disabling the muting function. $T_{MAX}$ time measurement may be stopped. At time I, safety sensor input may become inactive causing the output to become inactive.

In some examples, the timing of operations of the sensors between time B and time C may correspond with a minimum and a maximum time. Complying to the threshold time corresponding with the minimum or maximum time may trigger the muting to become active (e.g., allowing movement by the mobile drive unit with inventory holder). Similarly, the timing of operations of the sensors between time E and time F may correspond with a minimum and a maximum time. Exceeding the threshold time corresponding with the minimum or maximum time may trigger the muting to become inactive and the detection area may become protected (e.g., from movement of one or more operators).

In some examples, the programmable logic associated with illustration 600 of FIG. 6 may correspond with the determined states of state diagrams. Sample state diagrams are provided with FIGS. 7-9.

The differences between two times may correspond with a movement of the mobile drive unit. For example, when the mobile drive unit is at a first location, the first sensor bank of the pair of sensors may detect the mobile drive unit, but the second sensor bank of the pair of sensors may not detect the mobile drive unit.

In some examples, a muting sensor may activate. The muting sensor may disable protection rules for the area while the mobile drive unit occupies the detection space associated with the first sensor and the second sensor.

In some examples, the muting sensors may correspond with a delay value of the time that may be particular to a sensor bank (e.g., two inputs and one output). The delay value may correspond with the delay in physically activating or deactivating devices within the system. For example, there may be a delay illustrated in the sensor timing chart to account for transmitting a first electronic message to a backend computer system, processing the electronic message, and transmitting a second electronic message to instruct the device to perform an action in response to the first electronic message. This delay value may correspond with the expected pattern of devices in the system.

Figure 7:
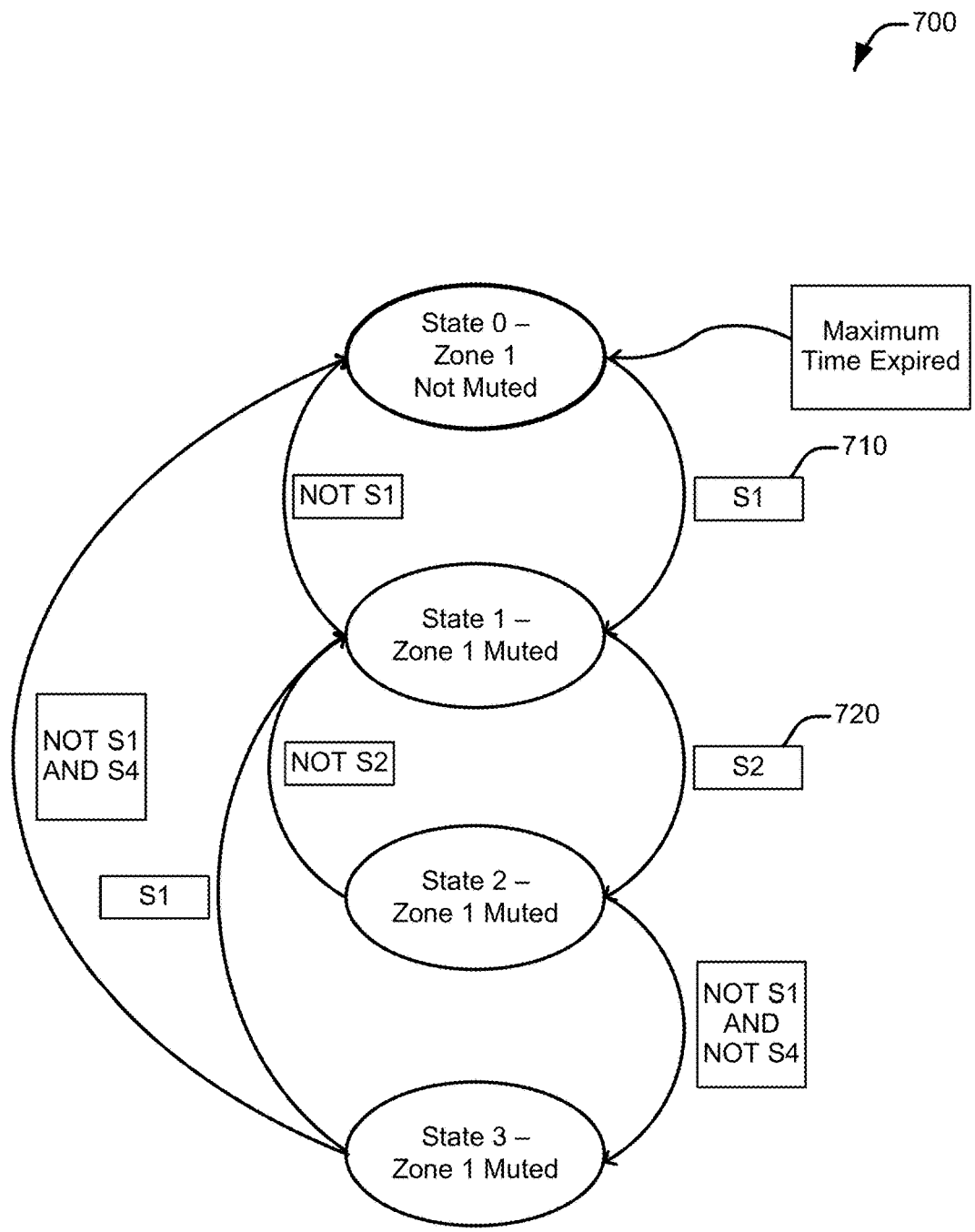
FIG. 7 illustrates a state diagram for zone 1 of a detection area, according to at least one embodiment of the disclosure.

FIG. 7 illustrates a state diagram for zone one of a detection area, according to at least one embodiment of the disclosure. The state transitions of zone one may correspond with the detection space illustrated in at least FIG. 5 and the timing of activation or deactivation of the sensors illustrated in FIG. 6.

The state diagrams may correspond with a plurality of states. For example, "state 0" may correspond with an Error State. The error state may be a result of either the power on entrance or the maximum time between sensor 1 and 2 active transitions (transitioning from 0 to 1) has expired or the maximum muting time has expired. Muting may be disabled in this state.

State 1 may correspond with a waiting for sensor 1 transition. This state may correspond with a normal operating state. The state may wait for sensor 1 to actively transition (transitioning from 0 to 1). Entrance into this state may be the result of either the reset from state 0 or the inactive transition of sensor 1 (transitioning from 1 to 0) from state 2 or 3. Exit out of this state may be the result of sensor 1 transitioning to an active value (transitioning from 0 to 1). Muting may be disabled in this state.

State 2 may correspond with a waiting for sensor 2 transition. This state may correspond with a normal operating state. The state may wait for sensor 2 to actively transition (transitioning from 0 to 1) while sensor 1 is active (value of 1). Entrance into this state may be the result of the active transition of sensor 1 (transitioning from 0 to 1) from state 1 or inactive transition of sensor 2 (transitioning from 1 to 0) from state 3. Exit out of this state may be the result of sensor 2 transitioning to an active value (transitioning from 0 to 1) while sensor 1 is active (value of 1) or sensor 1 transitioning to an inactive value (transitioning from 1 to 0) or the maximum time between sensor 1 and 2 transition has expired. Muting may be disabled in this state.

State 3 may correspond with a muting state. This state may correspond a normal operating state. The state may wait for sensor 1 or 2 to inactively transition (transitioning from 1 to 0) or the maximum muting time has expired. Entrance into this state may be the result of sensor 2 transitioning to an active value (transitioning from 0 to 1) while sensor 1 is active (value of 1) from state 2. Exit out of this state may be due to sensor 1 or 2 to inactively transition (transitioning from 1 to 0) or the maximum muting time has expiring. Muting may be enabled in this state.

In illustration 700, the sensor data may be received by the state machine. The state machine may transition from state to state at a time associated with the expected state. For example, starting at state zero, zone one may not be muted. In this illustration, when the zones are not muted, the protection rules may be active in the system to identify any approaching objects to the robotic arm through sensor data.

The state machine may transition to state one when sensor data is received from a first sensor 710. The muting of zone one may correspond with a temporary and automatic suspension of the safety function due to the movement of the mobile drive unit. This movement may correspond with a non-hazardous portion of the detection area covered by the first sensor 710. In some examples, the sensor data received from the one or more sensors may be muted to ignore approaching objects to the robotic arm.

In some examples, the system may stop protecting areas that the mobile drive units are entering and start protecting areas that the mobile drive units are leaving. For example, when the drive unit is entering an area labeled five, the system may still want to protect the area labeled four, as there may be potentially hazardous operations continued to be performed in the area labeled four.

The state may transition back to state zero when sensor data is no longer received from the first sensor 710. In some examples, the transition back to state zero may correspond with the sensor data from the first sensor 710 identifying that no object is approaching the robotic arm or within the detection space corresponding with zone one.

The state may transition back to state two when sensor data is received from the second sensor 720. The muting of zone one may continue with additional data from the second sensor 720. In some examples, the first sensor 710 and the second sensor 720 may be located in parallel to each other. The second sensor 720 may be implemented to activate at a distance that occurs later in time than the first sensor 710. For example, the first sensor 710 may be implemented to activate at a distance of fifty (50) inches between the first sensor 710 and the mobile drive unit, whereas the second sensor 720 may be implemented to activate at a distance of forty (40) inches between the second sensor 720 and the mobile drive unit. The activation of the first sensor 710 before the second sensor 720 may correspond with the expected pattern, at least in part because the mobile drive unit is moving towards the sensors in this particular zone.

The activation and deactivation of the state machine may correspond with the layout of zone one illustrated in FIG. 5. For example, the mobile drive unit may operate along a singular plane that is detected and expected by the sensors identified in zone one. The mobile drive unit, for example, may approach the sensor and the distance between the sensor in the mobile drive unit may decrease to identify that the mobile drive unit is approaching the sensor. Other zones, including zone two illustrated with FIG. 8 and zone three illustrated with FIG. 9, may correspond with the layout of those zones illustrated in FIG. 5.

Figure 8:
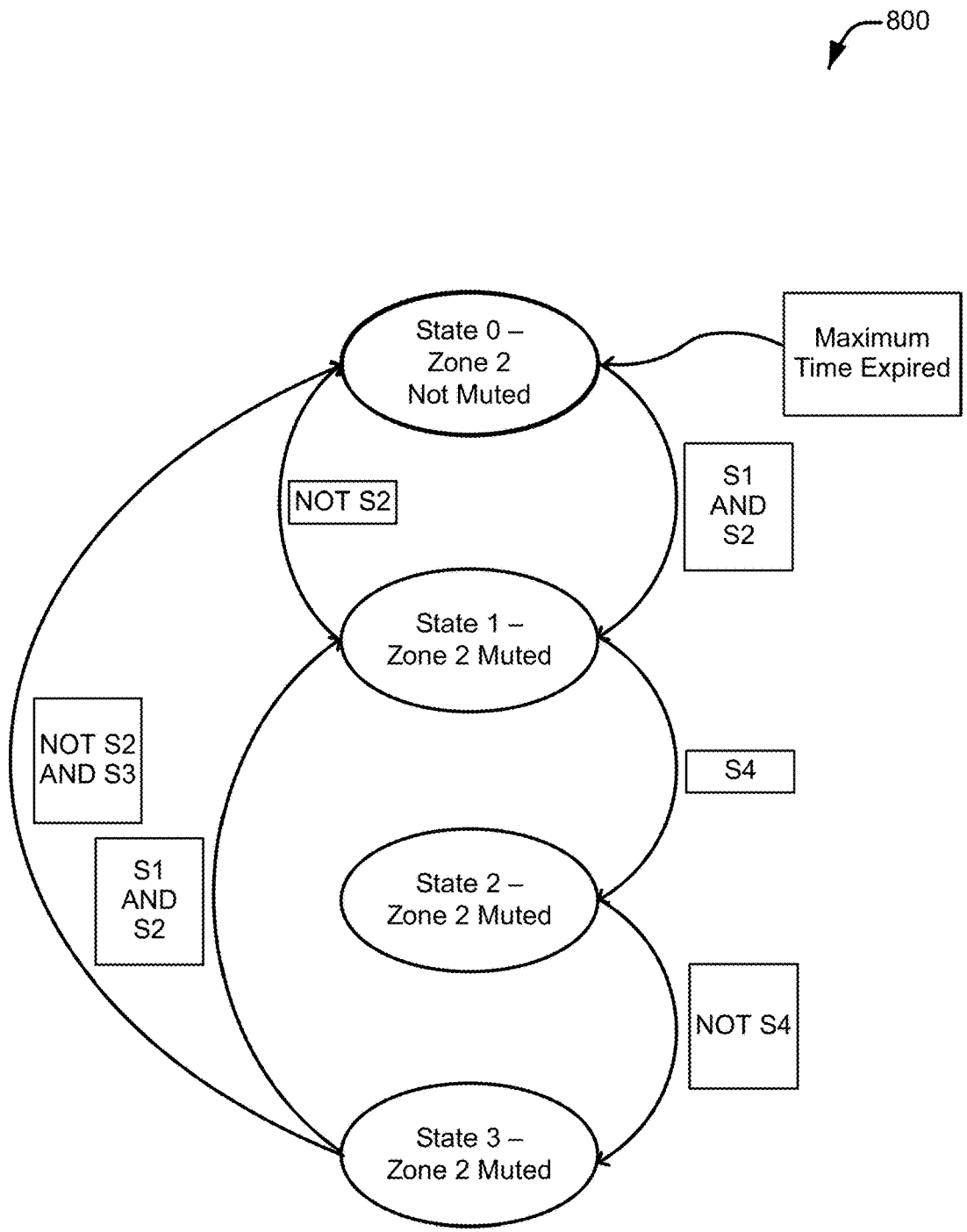
FIG. 8 illustrates a state diagram for zone 2 of a detection area, according to at least one embodiment of the disclosure.

FIG. 8 illustrates a state diagram for zone two of a detection area, according to at least one embodiment of the disclosure. The state transitions of zone two may correspond with the detection space illustrated in at least FIG. 5 and the timing of activation or deactivation of the sensors illustrated in FIG. 6.

In illustration 800, the expected pattern of operation for the mobile drive unit in zone two may correspond with a lateral movement (e.g., moving from left to right, in front of the first sensor followed by the second sensor, etc.). The sensor data may be received by the state machine, as explained with FIG. 7. The state machine may transition from state to state at a time associated with the expected state. For example, starting at state zero, zone two may not be muted and, at state one, zone two may be muted when both a first sensor bank and a second sensor bank identify movement in zone two.

Figure 9:
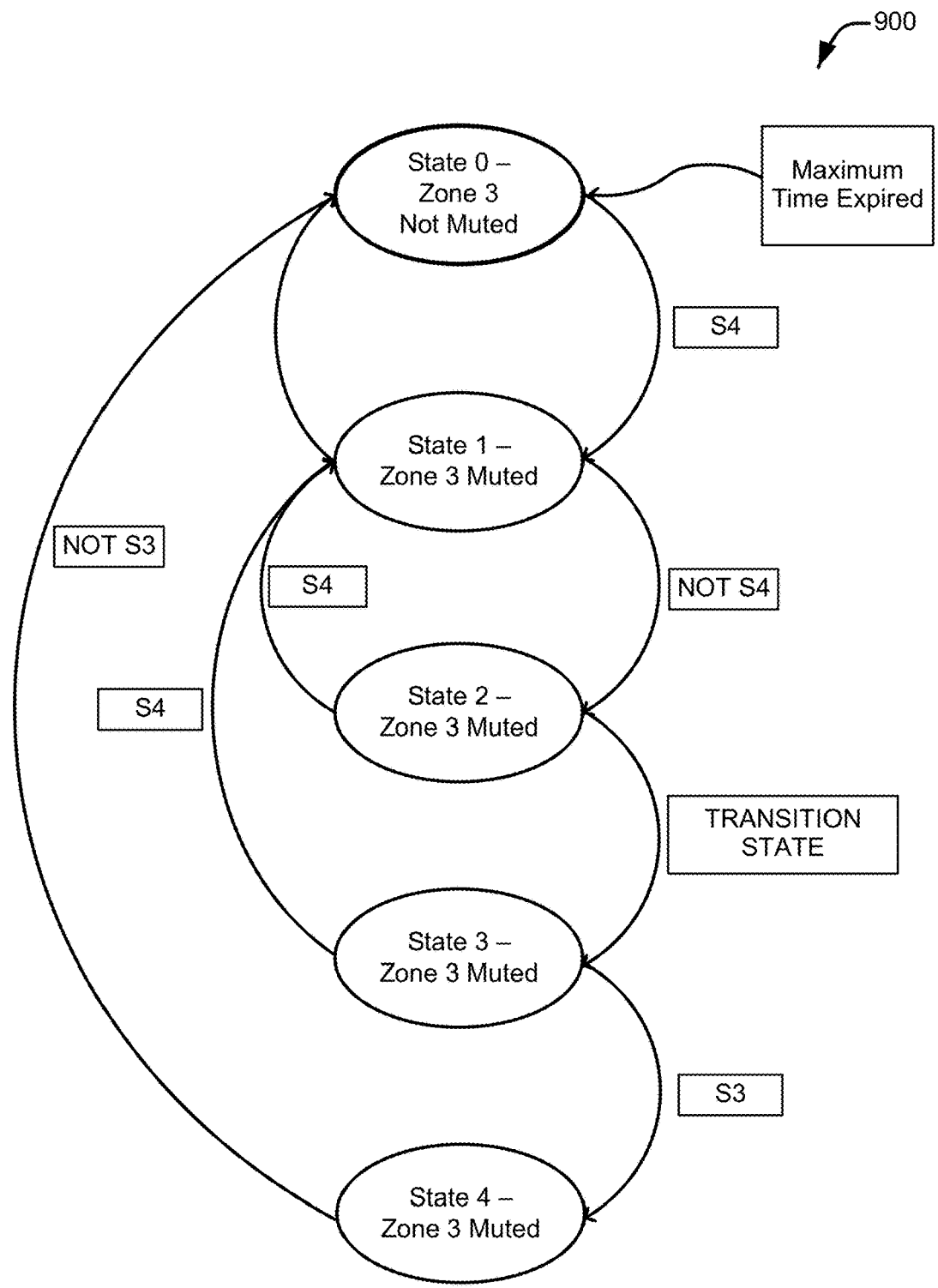
FIG. 9 illustrates a state diagram for zone 3 of a detection area, according to at least one embodiment of the disclosure.

FIG. 9 illustrates a state diagram for zone three of a detection area, according to at least one embodiment of the disclosure. The state transitions of zone three may correspond with the detection space illustrated in at least FIG. 5 and the timing of activation or deactivation of the sensors illustrated in FIG. 6.

In illustration 900, the expected pattern of operation for the mobile drive unit in zone three may correspond with a movement along a plane in a direction away from the sensors (e.g., moving from a detection space close to the sensors to a detection space at a greater distance from the sensors, etc.). The sensor data may be received by the state machine, as explained with FIG. 7. The state machine may transition from state to state at a time associated with the expected state. For example, starting at state zero, zone three may not be muted and, at state one, zone three may be muted when an object is identified in association with sensor bank four 540 illustrated with FIG. 5.

Figure 10:
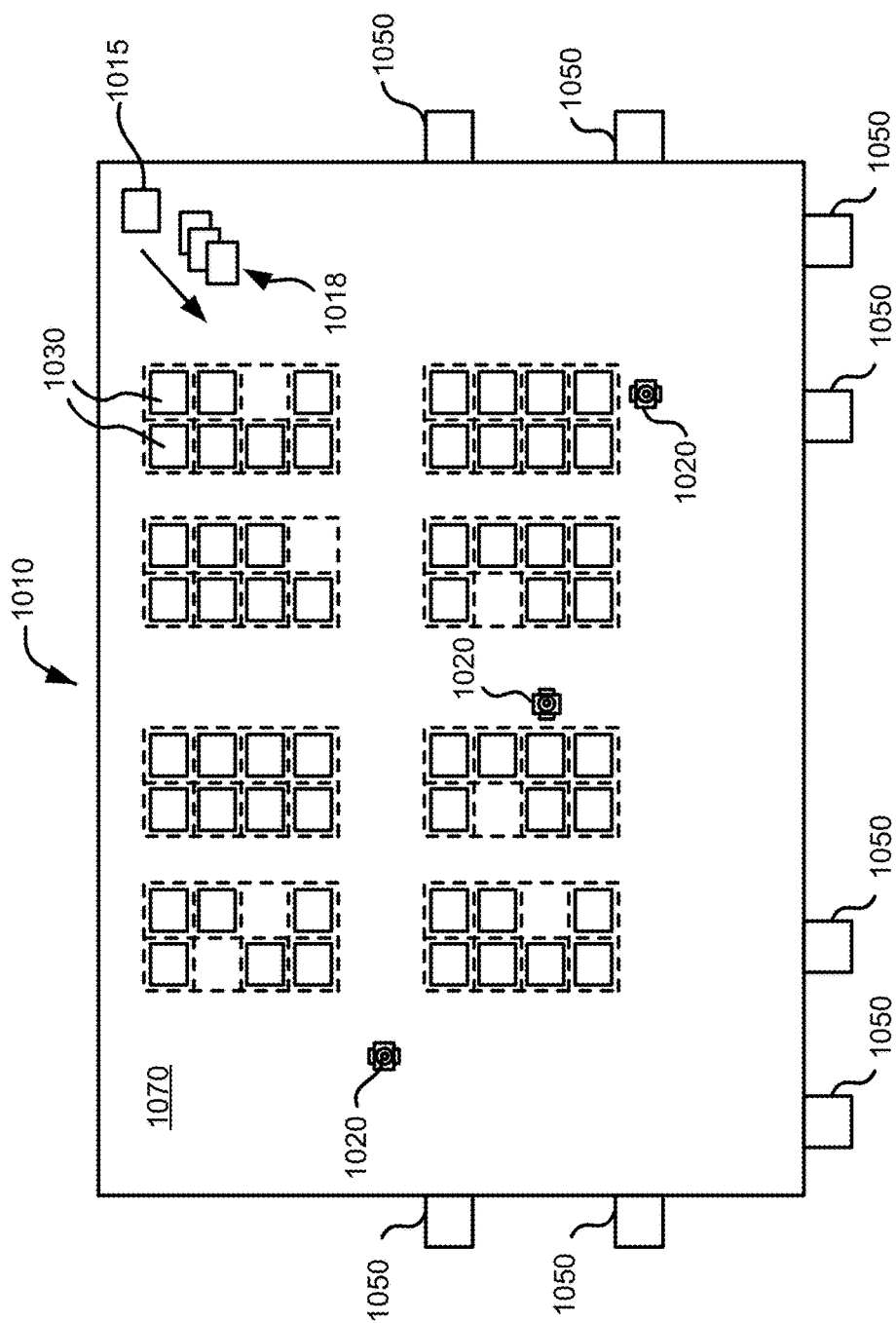
FIG. 10 illustrates components of an inventory system, according to at least one embodiment of the disclosure.

FIG. 10 illustrates the components of an inventory system 1010. Inventory system 1010 includes a management module 1015, one or more mobile drive units 1020, one or more inventory holders 1030, and one or more inventory stations 1050. Mobile drive units 1020 transport inventory holders 1030 between points within a workspace 1070 in response to commands communicated by management module 1015. Each inventory holder 1030 stores one or more types of inventory items. As a result, inventory system 1010 is capable of moving inventory items between locations within workspace 1070 to facilitate the entry, processing, and/or removal of inventory items from inventory system 1010 and the completion of other tasks involving inventory items.

Management module 1015 assigns tasks to appropriate components of inventory system 1010 and coordinates operation of the various components in completing the tasks. These tasks may relate not only to the movement and processing of inventory items, but also to the management and maintenance of the components of inventory system 1010. For example, management module 1015 may assign portions of workspace 1070 as parking spaces for mobile drive units 1020, the scheduled recharge or replacement of mobile drive unit batteries, the storage of empty inventory holders 1030, or any other operations associated with the functionality supported by inventory system 1010 and its various components. Management module 1015 may select components of inventory system 1010 to perform these tasks and communicate appropriate commands and/or data to the selected components to facilitate completion of these operations. Although shown in FIG. 10 as a single, discrete component, management module 1015 may represent multiple components and may represent or include portions of mobile drive units 1020 or other elements of inventory system 1010. As a result, any or all of the interactions between a particular mobile drive unit 1020 and management module 1015 that are described below may, in particular embodiments, represent peer-to-peer communication between that mobile drive unit 1020 and one or more other mobile drive units 1020. The components and operation of an example embodiment of management module 1015 are discussed further below with respect to FIG. 11.

Mobile drive units 1020 move inventory holders 1030 between locations within workspace 1070. Mobile drive units 1020 may represent any devices or components appropriate for use in inventory system 1010 based on the characteristics and configuration of inventory holders 1030 and/or other elements of inventory system 1010. In a particular embodiment of inventory system 1010, mobile drive units 1020 represent independent, self-powered devices configured to freely move about workspace 1070. Examples of such inventory systems are disclosed in U.S. Pat. No. 9,087,314, issued on Jul. 21, 2015, entitled "SYSTEM AND METHOD FOR POSITIONING A MOBILE DRIVE UNIT" and U.S. Pat. No. 8,280,547, issued on Oct. 2, 2012, entitled "METHOD AND SYSTEM FOR TRANSPORTING INVENTORY ITEMS," the entire disclosures of which are herein incorporated by reference. In alternative embodiments, mobile drive units 1020 represent elements of a tracked inventory system configured to move inventory holder 1030 along tracks, rails, cables, crane system, or other guidance or support elements traversing workspace 1070. In such an embodiment, mobile drive units 1020 may receive power and/or support through a connection to the guidance elements, such as a powered rail. Additionally, in particular embodiments of inventory system 1010, mobile drive units 1020 may be configured to utilize alternative conveyance equipment to move within workspace 1070 and/or between separate portions of workspace 1070. The components and operation of an example embodiment of a mobile drive unit 1020 are discussed further below with respect to FIGS. 12 and 13.

Additionally, mobile drive units 1020 may be capable of communicating with management module 1015 to receive information identifying selected inventory holders 1030, transmit the locations of mobile drive units 1020, or exchange any other suitable information to be used by management module 1015 or mobile drive units 1020 during operation. Mobile drive units 1020 may communicate with management module 1015 wirelessly, using wired connections between mobile drive units 1020 and management module 1015, and/or in any other appropriate manner. As one example, particular embodiments of mobile drive unit 1020 may communicate with management module 1015 and/or with one another using 802.11, Bluetooth®, or Infrared Data Association (IrDA) standards, or any other appropriate wireless communication protocol. As another example, in a tracked inventory system 1010, tracks or other guidance elements upon which mobile drive units 1020 move may be wired to facilitate communication between mobile drive units 1020 and other components of inventory system 1010. Furthermore, as noted above, management module 1015 may include components of individual mobile drive units 1020. Thus, for the purposes of this description and the claims that follow, communication between management module 1015 and a particular mobile drive unit 1020 may represent communication between components of a particular mobile drive unit 1020. In general, mobile drive units 1020 may be powered, propelled, and controlled in any manner appropriate based on the configuration and characteristics of inventory system 1010.

Inventory holders 1030 store inventory items. In a particular embodiment, inventory holders 1030 include multiple storage bins with each storage bin capable of holding one or more types of inventory items. Inventory holders 1030 are capable of being carried, rolled, and/or otherwise moved by mobile drive units 1020. In particular embodiments, inventory holder 1030 may provide additional propulsion to supplement that provided by mobile drive unit 1020 when moving inventory holder 1030.

Additionally, in particular embodiments, inventory items may also hang from hooks or bars (not shown) within or on inventory holder 1030. In general, inventory holder 1030 may store inventory items in any appropriate manner within inventory holder 1030 and/or on the external surface of inventory holder 1030.

Additionally, each inventory holder 1030 may include a plurality of faces, and each bin may be accessible through one or more faces of the inventory holder 1030. For example, in a particular embodiment, inventory holder 1030 includes four faces. In such an embodiment, bins located at a corner of two faces may be accessible through either of those two faces, while each of the other bins is accessible through an opening in one of the four faces. Mobile drive unit 1020 may be configured to rotate inventory holder 1030 at appropriate times to present a particular face and the bins associated with that face to an operator or other components of inventory system 1010.

Inventory items represent any objects suitable for storage, retrieval, and/or processing in an automated inventory system 1010. For the purposes of this description, "inventory items" may represent any one or more objects of a particular type that are stored in inventory system 1010. Thus, a particular inventory holder 1030 is currently "storing" a particular inventory item if the inventory holder 1030 currently holds one or more units of that type. As one example, inventory system 1010 may represent a mail order warehouse facility, and inventory items may represent merchandise stored in the warehouse facility. During operation, mobile drive units 1020 may retrieve inventory holders 1030 containing one or more inventory items requested in an order to be packed for delivery to a customer or inventory holders 1030 carrying pallets containing aggregated collections of inventory items for shipment. Moreover, in particular embodiments of inventory system 1010, boxes containing completed orders may themselves represent inventory items.

In particular embodiments, inventory system 1010 may also include one or more inventory stations 1050. Inventory stations 1050 represent locations designated for the completion of particular tasks involving inventory items. Such tasks may include the removal of inventory items from inventory holders 1030, the introduction of inventory items into inventory holders 1030, the counting of inventory items in inventory holders 1030, the decomposition of inventory items (e.g. from pallet- or case-sized groups to individual inventory items), the consolidation of inventory items between inventory holders 1030, and/or the processing or handling of inventory items in any other suitable manner. In particular embodiments, inventory stations 1050 may just represent the physical locations where a particular task involving inventory items can be completed within workspace 1070. In alternative embodiments, inventory stations 1050 may represent both the physical location and also any appropriate equipment for processing or handling inventory items, such as scanners for monitoring the flow of inventory items in and out of inventory system 1010, communication interfaces for communicating with management module 1015, and/or any other suitable components. Inventory stations 1050 may be controlled, entirely or in part, by operators or may be fully automated (e.g., using a robotic arm and a plurality of sensors). Moreover, the operator or automated operators of inventory stations 1050 may be capable of performing certain tasks to inventory items, such as packing, counting, or transferring inventory items, as part of the operation of inventory system 1010.

Workspace 1070 represents an area associated with inventory system 1010 in which mobile drive units 1020 can move and/or inventory holders 1030 can be stored. For example, workspace 1070 may represent all or part of the floor of a mail-order warehouse in which inventory system 1010 operates. Although FIG. 10 shows, for the purposes of illustration, an embodiment of inventory system 1010 in which workspace 1070 includes a fixed, predetermined, and finite physical space, particular embodiments of inventory system 1010 may include mobile drive units 1020 and inventory holders 1030 that are configured to operate within a workspace 1070 that is of variable dimensions and/or an arbitrary geometry. While FIG. 10 illustrates a particular embodiment of inventory system 1010 in which workspace 1070 is entirely enclosed in a building, alternative embodiments may utilize workspaces 1070 in which some or all of the workspace 1070 is located outdoors, within a vehicle (such as a cargo ship), or otherwise unconstrained by any fixed structure.

In operation, management module 1015 selects appropriate components to complete particular tasks and transmits task assignments 1018 to the selected components to trigger completion of the relevant tasks. Each task assignment 1018 defines one or more tasks to be completed by a particular component. These tasks may relate to the retrieval, storage, replenishment, and counting of inventory items and/or the management of mobile drive units 1020, inventory holders 1030, inventory stations 1050, and other components of inventory system 1010. Depending on the component and the task to be completed, a particular task assignment 1018 may identify locations, components, and/or actions associated with the corresponding task and/or any other appropriate information to be used by the relevant component in completing the assigned task.

In particular embodiments, management module 1015 generates task assignments 1018 based, in part, on inventory requests that management module 1015 receives from other components of inventory system 1010 and/or from external components in communication with management module 1015. These inventory requests identify particular operations to be completed involving inventory items stored or to be stored within inventory system 1010 and may represent communication of any suitable form. For example, in particular embodiments, an inventory request may represent a shipping order specifying particular inventory items that have been purchased by a customer and that are to be retrieved from inventory system 1010 for shipment to the customer. Management module 1015 may also generate task assignments 1018 independently of such inventory requests, as part of the overall management and maintenance of inventory system 1010. For example, management module 1015 may generate task assignments 1018 in response to the occurrence of a particular event (e.g., in response to a mobile drive unit 1020 requesting a space to park), according to a predetermined schedule (e.g., as part of a daily start-up routine), or at any appropriate time based on the configuration and characteristics of inventory system 1010. After generating one or more task assignments 1018, management module 1015 transmits the generated task assignments 1018 to appropriate components for completion of the corresponding task. The relevant components then execute their assigned tasks.

With respect to mobile drive units 1020 specifically, management module 1015 may, in particular embodiments, communicate task assignments 1018 to selected mobile drive units 1020 that identify one or more destinations for the selected mobile drive units 1020. Management module 1015 may select a mobile drive unit 1020 to assign the relevant task based on the location or state of the selected mobile drive unit 1020, an indication that the selected mobile drive unit 1020 has completed a previously-assigned task, a predetermined schedule, and/or any other suitable consideration. These destinations may be associated with an inventory request the management module 1015 is executing or a management objective the management module 1015 is attempting to fulfill. For example, the task assignment may define the location of an inventory holder 1030 to be retrieved, an inventory station 1050 to be visited, a storage location where the mobile drive unit 1020 should park until receiving another task, or a location associated with any other task appropriate based on the configuration, characteristics, and/or state of inventory system 1010, as a whole, or individual components of inventory system 1010.

For example, in particular embodiments, such decisions may be based on the popularity of particular inventory items, the staffing of a particular inventory station 1050, the tasks currently assigned to a particular mobile drive unit 1020, and/or any other appropriate considerations.

As part of completing these tasks mobile drive units 1020 may dock with and transport inventory holders 1030 within workspace 1070. Mobile drive units 1020 may dock with inventory holders 1030 by connecting to, lifting, and/or otherwise interacting with inventory holders 1030 in any other suitable manner so that, when docked, mobile drive units 1020 are coupled to and/or support inventory holders 1030 and can move inventory holders 1030 within workspace 1070. While the description below focuses on particular embodiments of mobile drive unit 1020 and inventory holder 1030 that are configured to dock in a particular manner, alternative embodiments of mobile drive unit 1020 and inventory holder 1030 may be configured to dock in any manner suitable to allow mobile drive unit 1020 to move inventory holder 1030 within workspace 1070. Additionally, as noted below, in particular embodiments, mobile drive units 1020 represent all or portions of inventory holders 1030. In such embodiments, mobile drive units 1020 may not dock with inventory holders 1030 before transporting inventory holders 1030 and/or mobile drive units 1020 may each remain continually docked with a particular inventory holder 1030.

While the appropriate components of inventory system 1010 complete assigned tasks, management module 1015 may interact with the relevant components to ensure the efficient use of space, equipment, manpower, and other resources available to inventory system 1010. As one specific example of such interaction, management module 1015 is responsible, in particular embodiments, for planning the paths mobile drive units 1020 take when moving within workspace 1070 and for allocating use of a particular portion of workspace 1070 to a particular mobile drive unit 1020 for purposes of completing an assigned task. In such embodiments, mobile drive units 1020 may, in response to being assigned a task, request a path to a particular destination associated with the task. Moreover, while the description below focuses on one or more embodiments in which mobile drive unit 1020 requests paths from management module 1015, mobile drive unit 1020 may, in alternative embodiments, generate its own paths.

Components of inventory system 1010 may provide information to management module 1015 regarding their current state, other components of inventory system 1010 with which they are interacting, and/or other conditions relevant to the operation of inventory system 1010. This may allow management module 1015 to utilize feedback from the relevant components to update algorithm parameters, adjust policies, or otherwise modify its decision-making to respond to changes in operating conditions or the occurrence of particular events.

In addition, while management module 1015 may be configured to manage various aspects of the operation of the components of inventory system 1010, in particular embodiments, the components themselves may also be responsible for decision-making relating to certain aspects of their operation, thereby reducing the processing load on management module 1015.

Thus, based on its knowledge of the location, current state, and/or other characteristics of the various components of inventory system 1010 and an awareness of all the tasks currently being completed, management module 1015 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 1010 may be able to support a number of techniques for efficiently executing various aspects of the operation of inventory system 1010. As a result, particular embodiments of management module 1015 may, by implementing one or more management techniques described below, enhance the efficiency of inventory system 1010 and/or provide other operational benefits.

Figure 11:
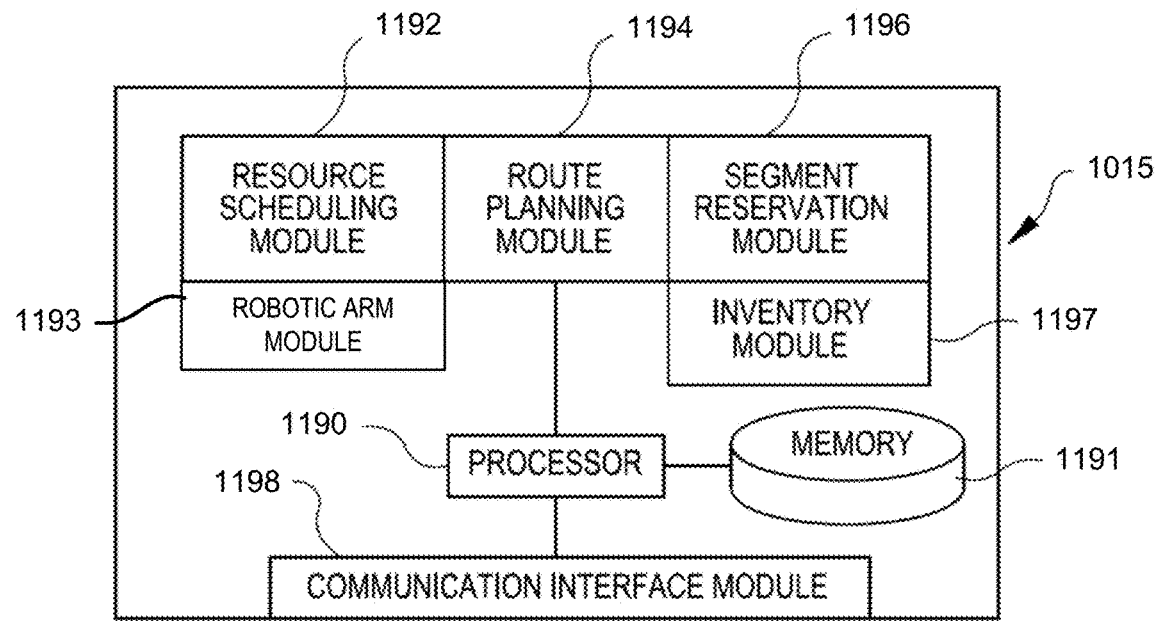
FIG. 11 illustrates in greater detail the components of an example management module that may be utilized in particular embodiments of the inventory system shown in FIG. 10.

FIG. 11 illustrates in greater detail the components of a particular embodiment of management module 1015. As shown, the example embodiment includes a resource scheduling module 1192, a robotic arm module 1193, a route planning module 1194, a segment reservation module 1196, an inventory module 1197, a communication interface module 1198, a processor 1190, and a memory 1191. Management module 1015 may represent a single component, multiple components located at a central location within inventory system 1010, or multiple components distributed throughout inventory system 1010. For example, management module 1015 may represent components of one or more mobile drive units 1020 that are capable of communicating information between the mobile drive units 1020 and coordinating the movement of mobile drive units 1020 within workspace 1070. In general, management module 1015 may include any appropriate combination of hardware and/or software suitable to provide the described functionality.

Processor 1190 is operable to execute instructions associated with the functionality provided by management module 1015. Processor 1190 may comprise one or more general purpose computers, dedicated microprocessors, or other processing devices capable of communicating electronic information. Examples of processor 1190 include one or more application-specific integrated circuits (ASICs), field programmable gate arrays (FPGAs), digital signal processors (DSPs) and any other suitable specific or general purpose processors.

Memory 1191 stores processor instructions, inventory requests, reservation information, state information for the various components of inventory system 1010 and/or any other appropriate values, parameters, or information utilized by management module 1015 during operation. Memory 1191 may represent any collection and arrangement of volatile or nonvolatile, local or remote devices suitable for storing data. Examples of memory 1191 include, but are not limited to, random access memory (RAM) devices, read only memory (ROM) devices, magnetic storage devices, optical storage devices or any other suitable data storage devices.

Resource scheduling module 1192 processes received inventory requests and generates one or more assigned tasks to be completed by the components of inventory system 1010. Resource scheduling module 1192 may also select one or more appropriate components for completing the assigned tasks and, using communication interface module 1198, communicate the assigned tasks to the relevant components. Additionally, resource scheduling module 1192 may also be responsible for generating assigned tasks associated with various management operations, such as prompting mobile drive units 1020 to recharge batteries or have batteries replaced, instructing inactive mobile drive units 1020 to park in a location outside the anticipated traffic flow or a location near the anticipated site of future tasks, and/or directing mobile drive units 1020 selected for repair or maintenance to move towards a designated maintenance station.

Robotic arm module 1193 may process and transmit instructions to a robotic arm, including packing and stowing items between a conveyor belt and one or more inventory holders 1030 that are moved by the mobile drive units 1020. In some examples, the robotic arm may be ten feet tall, reach out to a width of eight feet wide, and be enabled to carry at least 100 pounds. In some examples, the robotic arm may comprise a Fanuc 2000iC/125L robotic arm. The operations of the robotic arm may be described in U.S. Pat. No. 9,492,923, issued on Nov. 15, 2016, entitled "GENERATING ROBOTIC GRASPING INSTRUCTIONS FOR INVENTORY ITEMS" and U.S. Pat. No. 9,561,587, issued on Feb. 7, 2017, entitled "ROBOTIC GRASPING OF ITEMS IN INVENTORY SYSTEM," the entire disclosures of which are incorporated herein by reference.

Route planning module 1194 receives route requests from mobile drive units 1020. These route requests identify one or more destinations associated with a task the requesting mobile drive unit 1020 is executing. In response to receiving a route request, route planning module 1194 generates a path to one or more destinations identified in the route request. Route planning module 1194 may implement any appropriate algorithms utilizing any appropriate parameters, factors, and/or considerations to determine the appropriate path. After generating an appropriate path, route planning module 1194 transmits a route response identifying the generated path to the requesting mobile drive unit 1020 using communication interface module 1198.

Segment reservation module 1196 receives reservation requests from mobile drive units 1020 attempting to move along paths generated by route planning module 1194. These reservation requests request the use of a particular portion of workspace 1070 (referred to herein as a "segment") to allow the requesting mobile drive unit 1020 to avoid collisions with other mobile drive units 1020 while moving across the reserved segment. In response to received reservation requests, segment reservation module 1196 transmits a reservation response granting or denying the reservation request to the requesting mobile drive unit 1020 using the communication interface module 1198.

The inventory module 1197 maintains information about the location and number of inventory items in the inventory system 1010. Information can be maintained about the number of inventory items in a particular inventory holder 1030, and the maintained information can include the location of those inventory items in the inventory holder 1030. The inventory module 1197 can also communicate with the mobile drive units 1020, utilizing task assignments 1018 to maintain, replenish or move inventory items within the inventory system 1010.

Communication interface module 1198 facilitates communication between management module 1015 and other components of inventory system 1010, including reservation responses, reservation requests, route requests, route responses, and task assignments. These reservation responses, reservation requests, route requests, route responses, and task assignments may represent communication of any form appropriate based on the capabilities of management module 1015 and may include any suitable information. Depending on the configuration of management module 1015, communication interface module 1198 may be responsible for facilitating either or both of wired and wireless communication between management module 1015 and the various components of inventory system 1010. In particular embodiments, management module 1015 may communicate using communication protocols such as 802.11, Bluetooth, or Infrared Data Association (IrDA) standards. Furthermore, management module 1015 may, in particular embodiments, represent a portion of mobile drive unit 1020 or other components of inventory system 1010. In such embodiments, communication interface module 1198 may facilitate communication between management module 1015 and other parts of the same system component.

In general, resource scheduling module 1192, robotic arm module 1193, route planning module 1194, segment reservation module 1196, inventory module 1197, and communication interface module 1198 may each represent any appropriate hardware and/or software suitable to provide the described functionality. In addition, as noted above, management module 1015 may, in particular embodiments, represent multiple different discrete components and any or all of resource scheduling module 1192, robotic arm module 1193, route planning module 1194, segment reservation module 1196, inventory module 1197, and communication interface module 1198 may represent components physically separate from the remaining elements of management module 1015. Moreover, any two or more of resource scheduling module 1192, robotic arm module 1193, route planning module 1194, segment reservation module 1196, inventory module 1197, and communication interface module 1198 may share common components. For example, in particular embodiments, resource scheduling module 1192, robotic arm module 1193, route planning module 1194, segment reservation module 1196, and inventory module 1197 represent computer processes executing on processor 1190 and communication interface module 1198 comprises a wireless transmitter, a wireless receiver, and a related computer process executing on processor 1190.

Figure 12:
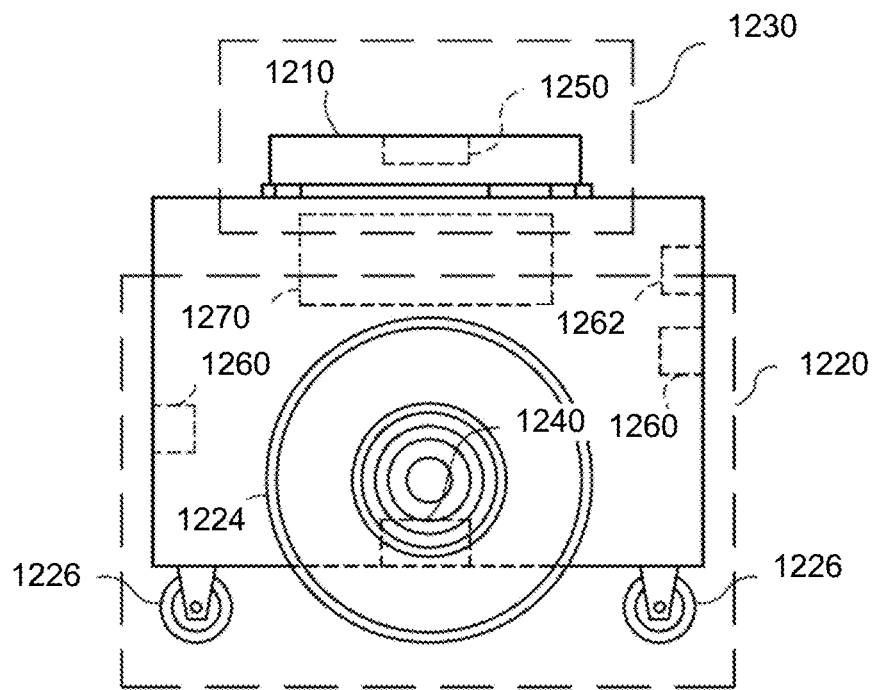
FIG. 12 illustrates a side view of an example mobile drive unit that may be utilized in particular embodiments of the inventory system shown in FIG. 10.
Figure 13:
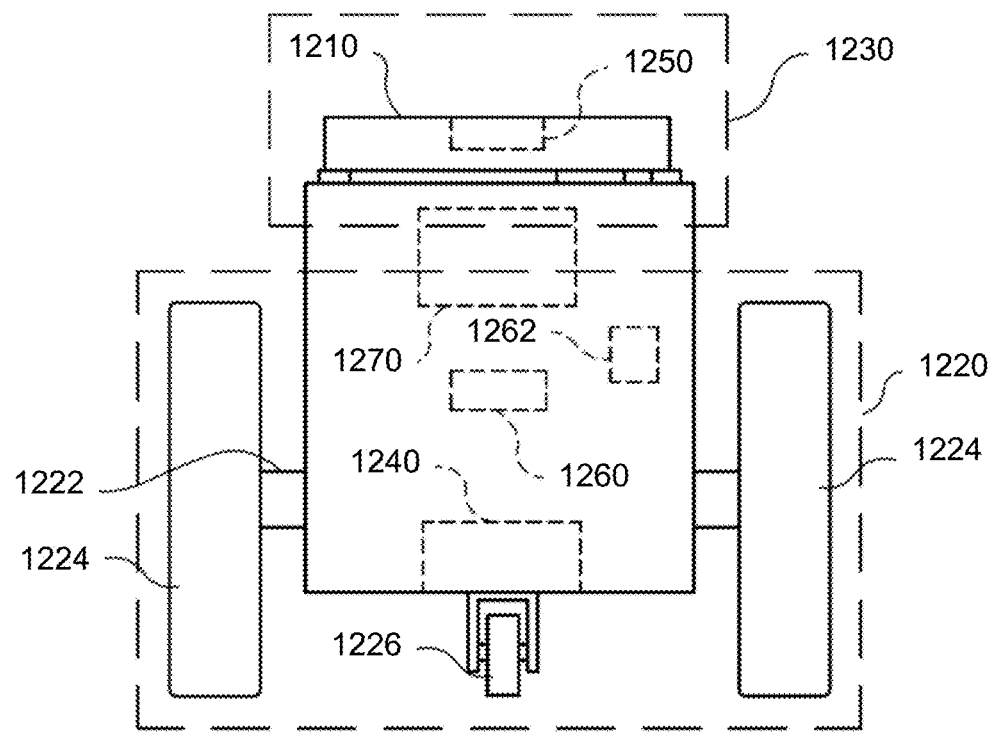
FIG. 13 illustrates a front view of an example mobile drive unit that may be utilized in particular embodiments of the inventory system shown in FIG. 10.

FIG. 12 illustrates a side view of an example mobile drive unit that may be utilized in particular embodiments of the inventory system shown in FIG. 10. FIG. 13 illustrates a front view of an example mobile drive unit that may be utilized in particular embodiments of the inventory system shown in FIG. 10.

In FIGS. 12-13, the mobile drive unit 1020 includes a docking head 1210, a drive module 1220, a docking actuator 1230, and a control module 1270. Additionally, mobile drive unit 1020 may include one or more sensors configured to detect or determine the location of mobile drive unit 1020, inventory holder 1030, and/or other appropriate elements of inventory system 1010. In the illustrated embodiment, mobile drive unit 1020 includes a position sensor 1240, a holder sensor 1250, an obstacle sensor 1260, and an identification signal transmitter 1262.

Docking head 1210, in particular embodiments of mobile drive unit 1020, couples mobile drive unit 1020 to inventory holder 1030 and/or supports inventory holder 1030 when mobile drive unit 1020 is docked to inventory holder 1030. Docking head 1210 may additionally allow mobile drive unit 1020 to maneuver inventory holder 1030, such as by lifting inventory holder 1030, propelling inventory holder 1030, rotating inventory holder 1030, and/or moving inventory holder 1030 in any other appropriate manner. Docking head 1210 may also include any appropriate combination of components, such as ribs, spikes, and/or corrugations, to facilitate such manipulation of inventory holder 1030. For example, in particular embodiments, docking head 1210 may include a high-friction portion that abuts a portion of inventory holder 1030 while mobile drive unit 1020 is docked to inventory holder 1030. In such embodiments, frictional forces created between the high-friction portion of docking head 1210 and a surface of inventory holder 1030 may induce translational and rotational movement in inventory holder 1030 when docking head 1210 moves and rotates, respectively. As a result, mobile drive unit 1020 may be able to manipulate inventory holder 1030 by moving or rotating docking head 1210, either independently or as a part of the movement of mobile drive unit 1020 as a whole.

Drive module 1220 propels mobile drive unit 1020 and, when mobile drive unit 1020 and inventory holder 1030 are docked, inventory holder 1030. Drive module 1220 may represent any appropriate collection of components operable to propel mobile drive unit 1020. For example, in the illustrated embodiment, drive module 1220 includes motorized axle 122, a pair of motorized wheels 1224, and a pair of stabilizing wheels 1226. One motorized wheel 1224 is located at each end of motorized axle 122, and one stabilizing wheel 1226 is positioned at each end of mobile drive unit 1020.

Docking actuator 1230 moves docking head 1210 towards inventory holder 1030 to facilitate docking of mobile drive unit 1020 and inventory holder 1030. Docking actuator 1230 may also be capable of adjusting the position or orientation of docking head 1210 in other suitable manners to facilitate docking. Docking actuator 1230 may include any appropriate components, based on the configuration of mobile drive unit 1020 and inventory holder 1030, for moving docking head 1210 or otherwise adjusting the position or orientation of docking head 1210. For example, in the illustrated embodiment, docking actuator 1230 includes a motorized shaft (not shown) attached to the center of docking head 1210. The motorized shaft is operable to lift docking head 1210 as appropriate for docking with inventory holder 1030.

Drive module 1220 may be configured to propel mobile drive unit 1020 in any appropriate manner. For example, in the illustrated embodiment, motorized wheels 1224 are operable to rotate in a first direction to propel mobile drive unit 1020 in a forward direction. Motorized wheels 1224 are also operable to rotate in a second direction to propel mobile drive unit 1020 in a backward direction. In the illustrated embodiment, drive module 1220 is also configured to rotate mobile drive unit 1020 by rotating motorized wheels 1224 in different directions from one another or by rotating motorized wheels 1224 at different speeds from one another.

Position sensor 1240 represents one or more sensors, detectors, or other components suitable for determining the location of mobile drive unit 1020 in any appropriate manner. For example, in particular embodiments, the workspace 1070 associated with inventory system 1010 includes a number of fiducial marks that mark points on a two-dimensional grid that covers all or a portion of workspace 1070. In such embodiments, position sensor 1240 may include a camera and suitable image- and/or video-processing components, such as an appropriately-programmed digital signal processor, to allow position sensor 1240 to detect fiducial marks within the camera's field of view. Control module 1270 may store location information that position sensor 1240 updates as position sensor 1240 detects fiducial marks. As a result, position sensor 1240 may utilize fiducial marks to maintain an accurate indication of the location mobile drive unit 1020 and to aid in navigation when moving within workspace 1070.

Holder sensor 1250 represents one or more sensors, detectors, or other components suitable for detecting inventory holder 1030 and/or determining, in any appropriate manner, the location of inventory holder 1030, as an absolute location or as a position relative to mobile drive unit 1020. Holder sensor 1250 may be capable of detecting the location of a particular portion of inventory holder 1030 or inventory holder 1030 as a whole. Mobile drive unit 1020 may then use the detected information for docking with or otherwise interacting with inventory holder 1030.

Obstacle sensor 1260 represents one or more sensors capable of detecting objects located in one or more different directions in which mobile drive unit 1020 is capable of moving. Obstacle sensor 1260 may utilize any appropriate components and techniques, including optical, radar, sonar, pressure-sensing and/or other types of detection devices appropriate to detect objects located in the direction of travel of mobile drive unit 1020. In particular embodiments, obstacle sensor 1260 may transmit information describing objects it detects to control module 1270 to be used by control module 1270 to identify obstacles and to take appropriate remedial actions to prevent mobile drive unit 1020 from colliding with obstacles and/or other objects.

Obstacle sensor 1260 may also detect signals transmitted by other mobile drive units 1020 operating in the vicinity of the illustrated mobile drive unit 1020. For example, in particular embodiments of inventory system 1010, one or more mobile drive units 1020 may include an identification signal transmitter 1262 that transmits a drive identification signal. The drive identification signal indicates to other mobile drive units 1020 that the object transmitting the drive identification signal is in fact a mobile drive unit. Identification signal transmitter 1262 may be capable of transmitting infrared, ultraviolet, audio, visible light, radio, and/or other suitable signals that indicate to recipients that the transmitting device is a mobile drive unit 1020.

Additionally, in particular embodiments, obstacle sensor 1260 may also be capable of detecting state information transmitted by other mobile drive units 1020. For example, in particular embodiments, identification signal transmitter 1262 may be capable of including state information relating to mobile drive unit 1020 in the transmitted identification signal. This state information may include, but is not limited to, the position, velocity, direction, and the braking capabilities of the transmitting mobile drive unit 1020. In particular embodiments, mobile drive unit 1020 may use the state information transmitted by other mobile drive units to avoid collisions when operating in close proximity with those other mobile drive units.

Control module 1270 monitors and/or controls operation of drive module 1220 and docking actuator 1230. Control module 1270 may also receive information from sensors such as position sensor 1240 and holder sensor 1250 and adjust the operation of drive module 1220, docking actuator 1230, and/or other components of mobile drive unit 1020 based on this information. Additionally, in particular embodiments, mobile drive unit 1020 may be configured to communicate with a management device of inventory system 1010 and control module 1270 may receive commands transmitted to mobile drive unit 1020 and communicate information back to the management device utilizing appropriate communication components of mobile drive unit 1020. Control module 1270 may include any appropriate hardware and/or software suitable to provide the described functionality. In particular embodiments, control module 1270 includes a general-purpose microprocessor programmed to provide the described functionality. Additionally, control module 1270 may include all or portions of docking actuator 1230, drive module 1220, position sensor 1240, and/or holder sensor 1250, and/or share components with any of these elements of mobile drive unit 1020.

Moreover, in particular embodiments, control module 1270 may include hardware and software located in components that are physically distinct from the device that houses drive module 1220, docking actuator 1230, and/or the other components of mobile drive unit 1020 described above. For example, in particular embodiments, each mobile drive unit 1020 operating in inventory system 1010 may be associated with a software process (referred to here as a "drive agent") operating on a server that is in communication with the device that houses drive module 1220, docking actuator 1230, and other appropriate components of mobile drive unit 1020. This drive agent may be responsible for requesting and receiving tasks, requesting and receiving routes, transmitting state information associated with mobile drive unit 1020, and/or otherwise interacting with management module 1015 and other components of inventory system 1010 on behalf of the device that physically houses drive module 1220, docking actuator 1230, and the other appropriate components of mobile drive unit 1020. As a result, for the purposes of this description and the claims that follow, the term "mobile drive unit" includes software and/or hardware, such as agent processes, that provides the described functionality on behalf of mobile drive unit 1020 but that may be located in physically distinct devices from the drive module 1220, docking actuator 1230, and/or the other components of mobile drive unit 1020 described above.

While FIGS. 12 and 13 illustrate a particular embodiment of mobile drive unit 1020 containing certain components and configured to operate in a particular manner, mobile drive unit 1020 may represent any appropriate component and/or collection of components configured to transport and/or facilitate the transport of inventory holders 1030. As another example, mobile drive unit 1020 may represent part of an overhead crane system in which one or more crane assemblies are capable of moving within a network of wires or rails to a position suitable to dock with a particular inventory holder 1030. After docking with inventory holder 1030, the crane assembly may then lift inventory holder 1030 and move inventory to another location for purposes of completing an assigned task.

Furthermore, in particular embodiments, mobile drive unit 1020 may represent all or a portion of inventory holder 1030. Inventory holder 1030 may include motorized wheels or any other components suitable to allow inventory holder 1030 to propel itself. As one specific example, a portion of inventory holder 1030 may be responsive to magnetic fields. Inventory system 1010 may be able to generate one or more controlled magnetic fields capable of propelling, maneuvering and/or otherwise controlling the position of inventory holder 1030 as a result of the responsive portion of inventory holder 1030. In such embodiments, mobile drive unit 1020 may represent the responsive portion of inventory holder 1030 and/or the components of inventory system 1010 responsible for generating and controlling these magnetic fields. While this description provides several specific examples, mobile drive unit 1020 may, in general, represent any appropriate component and/or collection of components configured to transport and/or facilitate the transport of inventory holders 1030.

Figure 14:
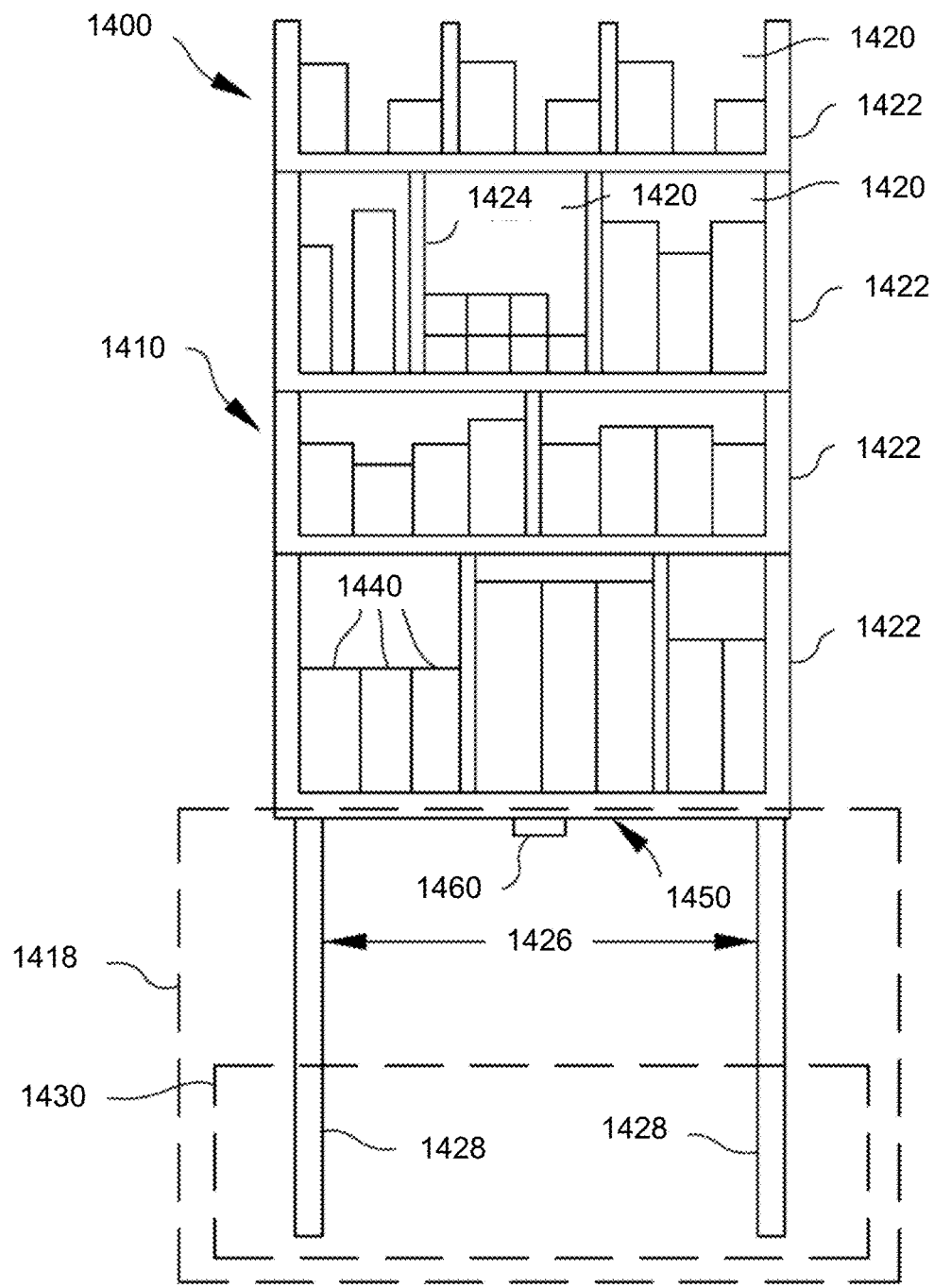
FIG. 14 illustrates in greater detail an example inventory holder that may be utilized in particular embodiments of the inventory system shown in FIG. 10.

FIG. 14 illustrates in greater detail the components of a particular embodiment of inventory holder 1030. In particular, FIG. 14 illustrates the structure and contents of one side of an example inventory holder 1030. In a particular embodiment, inventory holder 1030 may comprise any number of faces with similar or different structure. As illustrated, inventory holder 1030 includes a frame 1410, a plurality of legs 1428, and a docking surface 1450.

Frame 1410 holds inventory items. Frame 1410 provides storage space for storing inventory items external or internal to frame 1410. The storage space provided by frame 1410 may be divided into a plurality of inventory bins 1420, each capable of holding inventory items. Inventory bins 1420 may include any appropriate storage elements, such as bins, compartments, or hooks.

In a particular embodiment, frame 1410 is composed of a plurality of trays 1422 stacked upon one another and attached to or stacked on a base 1418. In such an embodiment, inventory bins 1420 may be formed by a plurality of adjustable dividers 1424 that may be moved to resize one or more inventory bins 1420. In alternative embodiments, frame 1410 may represent a single inventory bin 1420 that includes a single tray 1422 and no adjustable dividers 1424. Additionally, in particular embodiments, frame 1410 may represent a load-bearing surface mounted on mobility element 1430. Inventory items may be stored on such an inventory holder 1030 by being placed on frame 1410. In general, frame 1410 may include internal and/or external storage space divided into any appropriate number of inventory bins 1420 in any appropriate manner.

Additionally, in a particular embodiment, frame 1410 may include a plurality of device openings 1426 that allow mobile drive unit 1020 to position docking head 1210 adjacent docking surface 1450. The size, shape, and placement of device openings 1426 may be determined based on the size, the shape, and other characteristics of the particular embodiment of mobile drive unit 1020 and/or inventory holder 1030 utilized by inventory system 1010. For example, in the illustrated embodiment, frame 1410 includes four legs 1428 that form device openings 1426 and allow mobile drive unit 1020 to position mobile drive unit 1020 under frame 1410 and adjacent to docking surface 1450. The length of legs 1428 may be determined based on a height of mobile drive unit 1020.

Docking surface 1450 comprises a portion of inventory holder 1030 that couples to, abuts, and/or rests upon a portion of docking head 1210, when mobile drive unit 1020 is docked to inventory holder 1030. Additionally, docking surface 1450 supports a portion or all of the weight of inventory holder 1030 while inventory holder 1030 is docked with mobile drive unit 1020.

The composition, shape, and/or texture of docking surface 1450 may be designed to facilitate maneuvering of inventory holder 1030 by mobile drive unit 1020. For example, as noted above, in particular embodiments, docking surface 1450 may comprise a high-friction portion. When mobile drive unit 1020 and inventory holder 1030 are docked, frictional forces induced between docking head 1210 and this high-friction portion may allow mobile drive unit 1020 to maneuver inventory holder 1030. Additionally, in particular embodiments, docking surface 1450 may include appropriate components suitable to receive a portion of docking head 1210, couple inventory holder 1030 to mobile drive unit 1020, and/or facilitate control of inventory holder 1030 by mobile drive unit 1020.

The distance between two of the four legs 1428 of the inventory holder 1030 (e.g., width of the inventory holder) may, in some examples, be forty-six (46) inches. The distance between the docking surface 1450 of the inventory holder 1030 and the bottom of the four legs 1428 may, in some examples, be fifteen (15) inches. Other specifications of height and width of the inventory holder 1030 may be implemented without diverting from the scope of the disclosure. When other specifications are implemented, the specifications may be stored and compared to sensor data received by the plurality of sensors 410 to determine when an inventory holder 1030 is approaching the plurality of sensors 410, as described herein. In some examples, pairs of sensors may be placed at corresponding heights and widths of the inventory holder in order to help detect the approaching inventory holder using sensor data.

Holder identifier 1460 marks a predetermined portion of inventory holder 1030 and mobile drive unit 1020 may use holder identifier 1460 to align with inventory holder 1030 during docking and/or to determine the location of inventory holder 1030. More specifically, in particular embodiments, mobile drive unit 1020 may be equipped with components, such as holder sensor 1250, that can detect holder identifier 1460 and determine its location relative to mobile drive unit 1020. As a result, mobile drive unit 1020 may be able to determine the location of inventory holder 1030 as a whole. For example, in particular embodiments, holder identifier 1460 may represent a reflective marker that is positioned at a predetermined location on inventory holder 1030 and that holder sensor 1250 can optically detect using an appropriately-configured camera.

Depending on the configuration and characteristics of mobile drive unit 1020 and inventory system 1010, mobile drive unit 1020 may move inventory holder 1030 using a variety of appropriate methods. In a particular embodiment, mobile drive unit 1020 is capable of moving inventory holder 1030 along a two-dimensional grid, combining movement along straight-line segments with ninety-degree rotations and arcing paths to transport inventory holder 1030 from the first location to the second location. Additionally, while moving, mobile drive unit 1020 may use fixed objects located in the workspace as reference points to assist in navigation. For example, in particular embodiments, inventory system 1010 includes multiple fiducial marks. Mobile drive unit 1020 may be configured to detect fiducial marks and to determine the location of mobile drive unit 1020 and/or measure its movement based on the detection of fiducial marks.

After mobile drive unit 1020 arrives at the second location, mobile drive unit 1020 may perform appropriate operations to facilitate access to inventory items stored in inventory holder 1030. For example, mobile drive unit 1020 may rotate inventory holder 1030 to present a particular face of inventory holder 1030 to an operator of inventory system 1010 or other suitable party, such as a packer selecting inventory items from inventory holder 1030. Mobile drive unit 1020 may also undock from inventory holder 1030. Alternatively, instead of undocking at the second location, mobile drive unit 1020 may transport inventory holder 1030 back to the first location or to a third location after any appropriate actions have been taken involving inventory items. For example, after a packer has removed particular inventory items from inventory holder 1030, mobile drive unit 1020 may return inventory holder 1030 to its original storage location, a new storage location, or another inventory station. Mobile drive unit 1020 may then undock from inventory holder 1030 at this new location.

Figure 15:
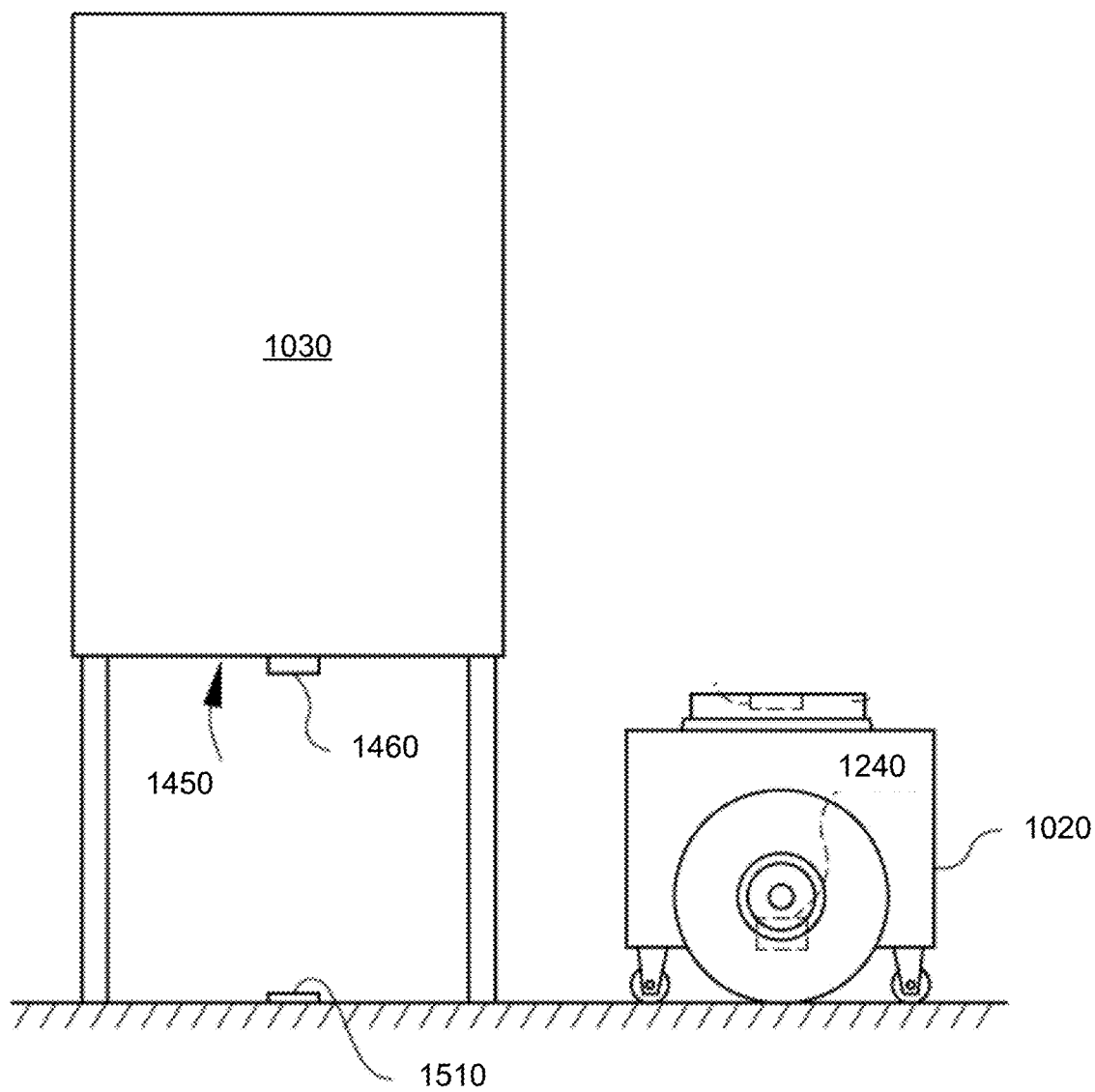
FIG. 15 illustrates an example operation of the mobile drive unit and the inventory holder, according to at least one embodiment of the disclosure.

FIG. 15 illustrates mobile drive unit 1020 and inventory holder 1030 prior to docking. As noted above, mobile drive unit 1020 may receive a command that identifies a location for a particular inventory holder 1030. Mobile drive unit 1020 may then move to the location specified in the command. Additionally, mobile drive unit 1020 may utilize position sensor 1240 to determine the location of mobile drive unit 1020 to assist in navigating to the location of inventory holder 1030.

In particular, FIG. 15 shows mobile drive unit 1020 and inventory holder 1030 as mobile drive unit 1020 approaches the storage location identified by the received command. In the illustrated embodiment, the reference point is marked by fiducial mark 1510 which comprises a surface operable to reflect light and which, as a result, can be detected by particular embodiments of position sensor 1240 when mobile drive unit 1020 is positioned over or approximately over fiducial mark 1510. As noted above, the illustrated embodiment of mobile drive unit 1020 utilizes optical sensors, including a camera and appropriate image- and/or video processing components, to detect fiducial marks.

Figure 16:
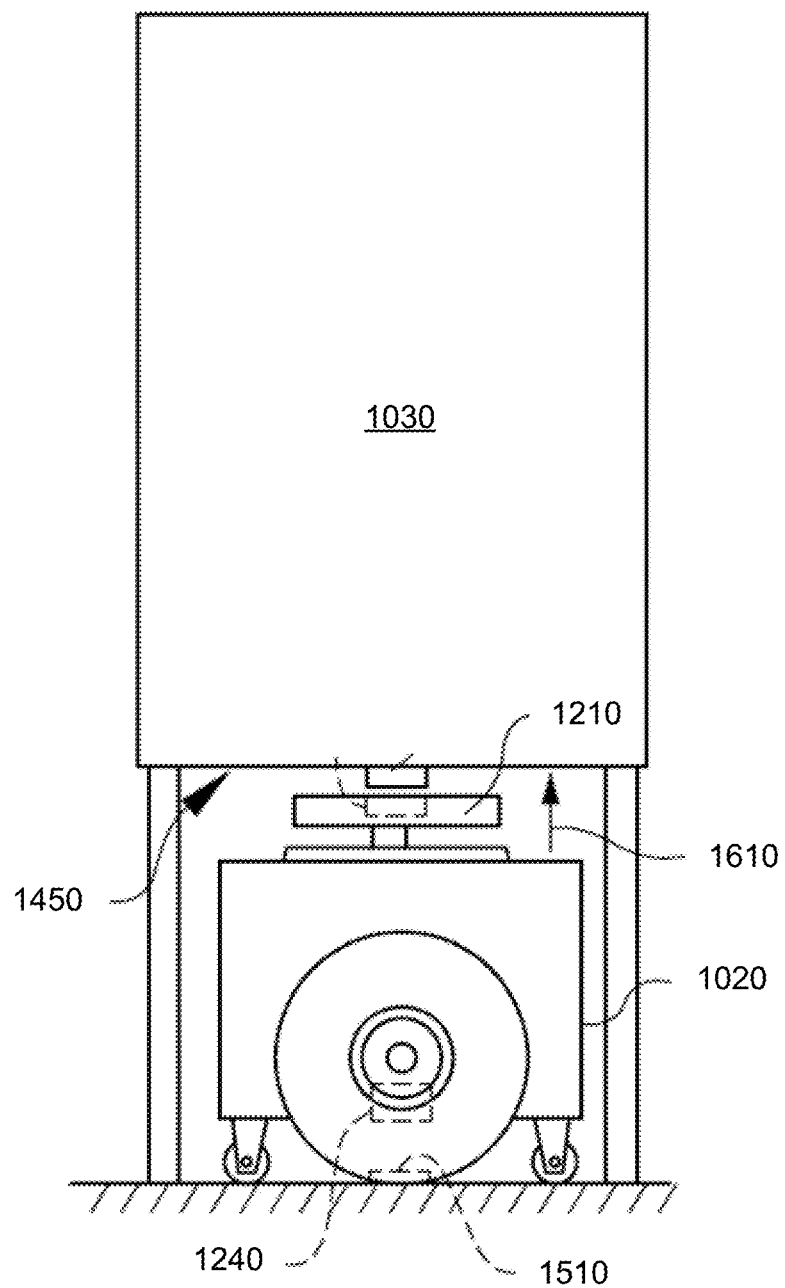
FIG. 16 illustrates an example operation of the mobile drive unit and the inventory holder, according to at least one embodiment of the disclosure.

FIG. 16 illustrates mobile drive unit 1020 and inventory holder 1030 once mobile drive unit 1020 reaches fiducial mark 1510. Because, in the illustrated example, fiducial mark 1510 marks the location of the reference point to which mobile drive unit 1020 is destined, mobile drive unit 1020 begins the docking process once mobile drive unit 1020 reaches fiducial mark 1510. In the illustrated example, mobile drive unit 1020 is configured to dock with inventory holder 1030 from a position beneath inventory holder 1030 and, as a result, inventory holder 1030 is stored so that docking surface 1450 is located directly above fiducial mark 1510.

After positioning itself over fiducial mark 1510, mobile drive unit 1020 begins the docking process. In the illustrated example, the docking process includes mobile drive unit 1020 raising docking head 1210 towards docking surface 1450, as indicated by arrow 1610. Additionally, in the illustrated example, mobile drive unit 1020 and inventory holder 1030 are configured so that mobile drive unit 1020 lifts inventory holder 1030 off the ground when mobile drive unit 1020 docks with inventory holder 1030 and, as a result, mobile drive unit 1020 supports the weight of inventory holder 1030 while mobile drive unit 1020 is docked to inventory holder 1030.

The mobile drive unit 1020 is capable of inducing translational and/or rotational movement in inventory holder 1030 while mobile drive unit 1020 is docked with inventory holder 1030. For example, in the illustrated embodiment, inventory holder 1030 is supported by mobile drive unit 1020 while the two components are docked and mobile drive unit 1020 is capable of inducing translational and/or rotational movement in inventory holder 1030 by moving or rotating itself or some sub-component of itself, such as docking head 1210. As a result, while mobile drive unit 1020 and inventory holder 1030 are docked mobile drive unit 1020 may move inventory holder 1030 to a requested destination based on commands received by mobile drive unit 1020.

Once mobile drive unit 1020 and inventory holder 1030 arrive at the destination, mobile drive unit 1020 may additionally rotate inventory holder 1030 to present a particular face of inventory holder 1030 to a packer or otherwise maneuver inventory holder 1030 to allow access to inventory items stored by inventory holder 1030. Mobile drive unit 1020 may then undock from inventory holder 1030, as described below, or move inventory holder to another destination. For example, mobile drive unit 1020 may move inventory holder 1030 to a packing station where a packer can select appropriate inventory items from inventory holder 1030. Mobile drive unit 1020 may then return inventory holder 1030 to its original location or another location appropriate for undocking, such as a new storage location reserved for inventory holder 1030.

Figure 17:
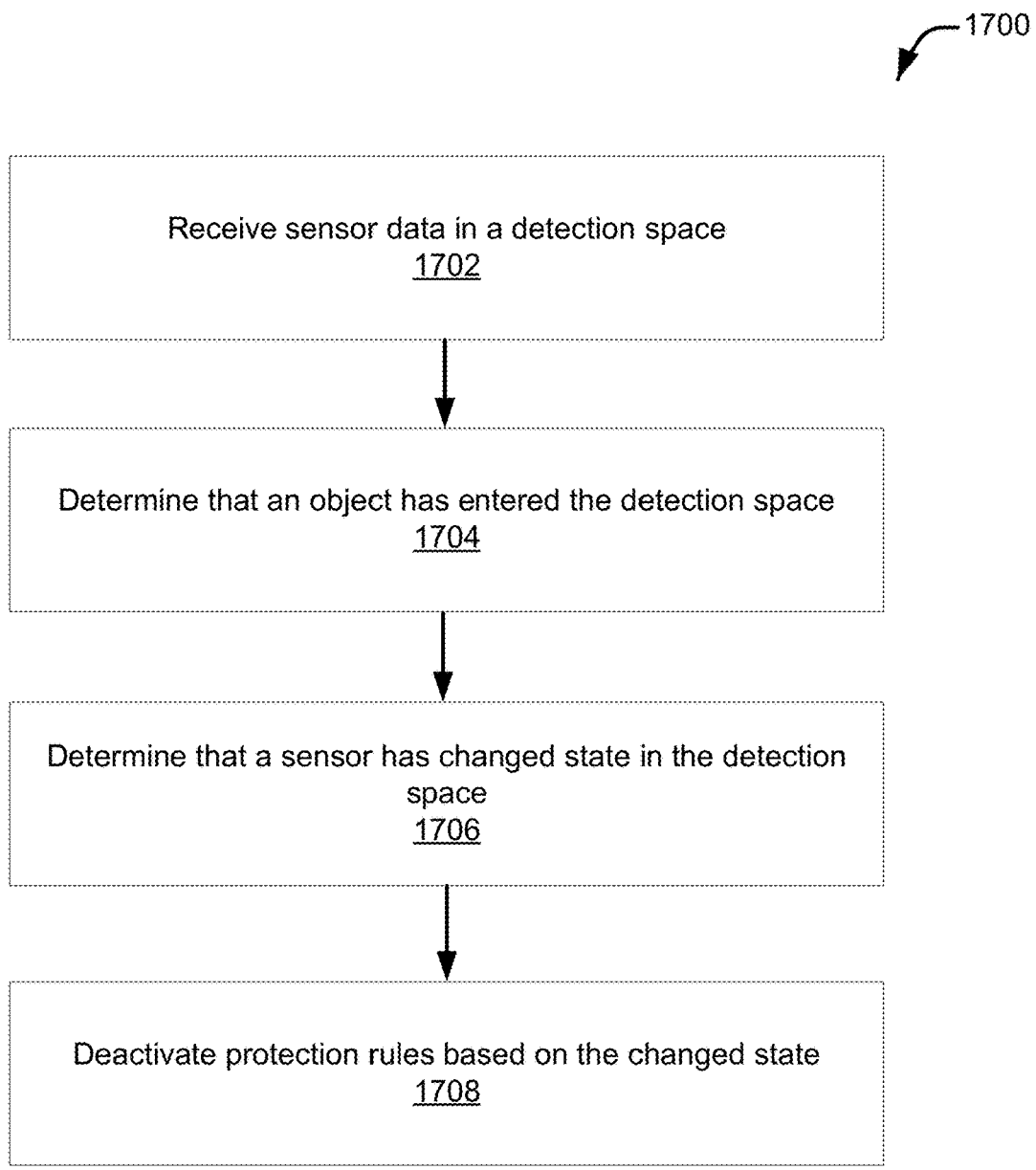
FIG. 17 illustrates an example flow diagram for defining a protection system for multi-zone robotic area, according to at least one embodiment of the disclosure.

FIG. 17 illustrates an example flow diagram for defining a protection system for multi-zone robotic area, according to at least one embodiment of the disclosure. In some examples, the management module 1015 shown in FIG. 10 may perform the process 1700 of FIG. 17.

Some or all of the process 1700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some examples, the process 1700 may be implemented by an inventory system that includes a mobile drive unit, a robotic arm, a plurality of sensors, and/or a management module. The mobile drive unit may be configured to autonomously move in a fulfillment center. The robotic arm may be configured to pack and stow items moved by the mobile drive unit within the fulfillment center. The plurality of sensors may be mounted or affixed to a location in association with the robotic arm. The plurality of sensors may comprise at least a pair of muting sensors and a pair of photoelectric sensors. The management module may be configured to communicate with the mobile drive unit, the robotic arm, and a plurality of sensors.

The process 1700 may begin at 1702 by receiving sensor data in a detection space. For example, a management module may receive sensor data in a detection space of a fulfillment center. The detection space may be adjacent to a robotic arm.

At 1704, an object may be determined to have entered the detection space. For example, a management module may receive the sensor data and analyze the sensor data for any interferences by objects with the detection space. The management module may determine that an object is to the detection space when, for example, a light curtain emitted by a sensor is broken by the object, as identified with the sensor data.

At 1706, a sensor data may change state. For example, the management module may determine that a sensor has changed state in the detection space. This may include a sensor receiving an indication that an object has broken a light curtain and the sensor may be toggled to an inactive state. In another example, the sensor may receive an instruction to stop receiving sensor data based on a muting of the sensor.

In some examples, the sensor data may be compared with a specification of a mobile drive unit and/or inventory holder. This may include, for example, a height of fifteen (15) inches or a width of forty-six (46) inches. When the sensor data identifies that the obstruction with the light curtain corresponds with one of the specifications, the management module may identify the object that interfered with the light curtain as the mobile drive unit and/or inventory holder.

At 1708, protection rules may be deactivated based on the change state. For example, the management module may deactivate protection rules associated with the detection area where the object was identified. The protection rules associated with detection space covered by the sensor may be deactivated while a mobile drive unit occupies the detection space.

Figure 18:
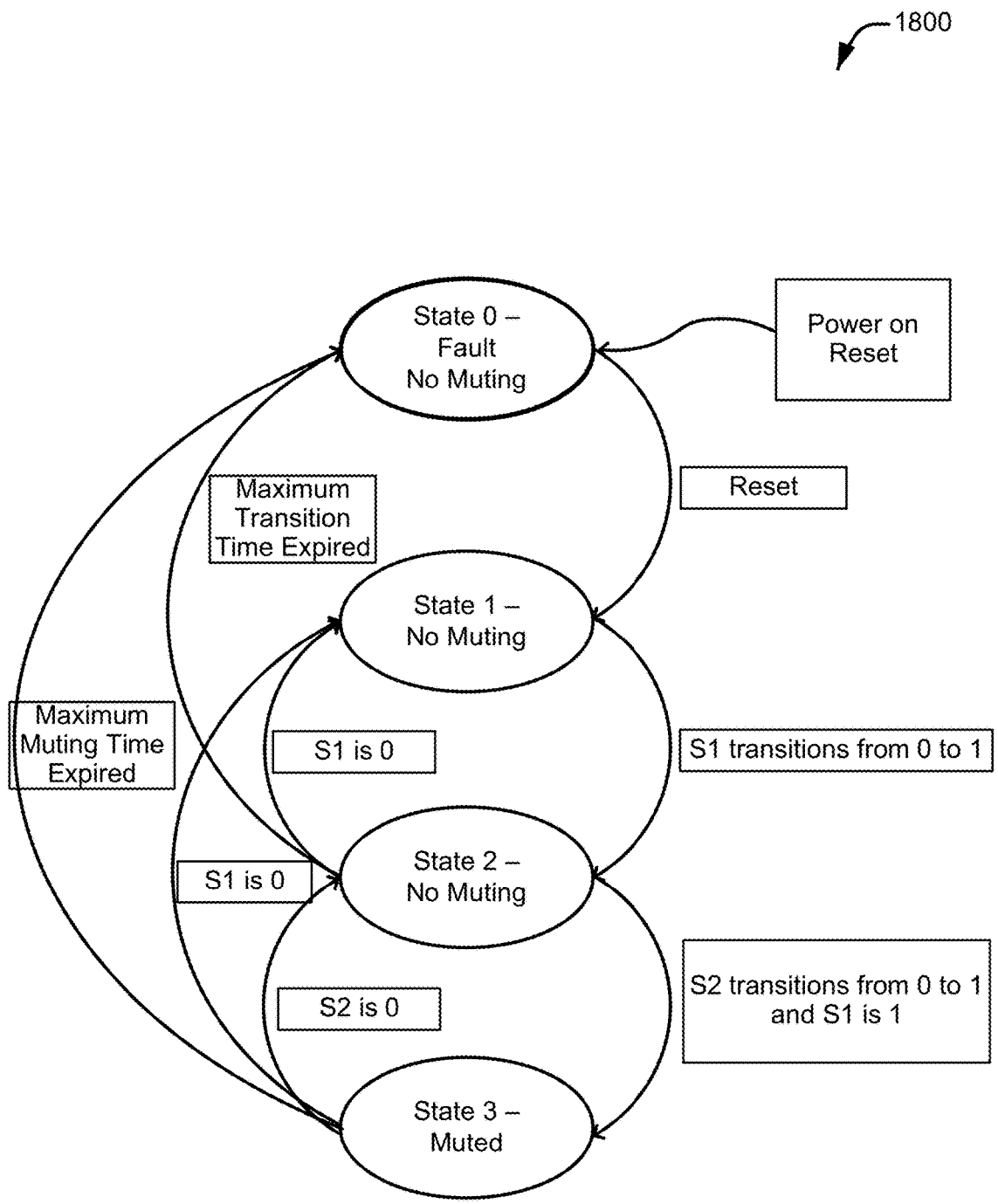
FIG. 18 illustrates a state diagram for the muting active, according to at least one embodiment of the disclosure.

FIG. 18 illustrates a state diagram for the muting active, according to at least one embodiment of the disclosure. In illustration 1800, the state diagram for muting may correspond with the pair of sensors in the sensor banks illustrated in FIGS. 7-9.

In some examples, fault detection may be implemented. The two sensor light curtain muting may correspond with six provisions to detect faults and to be fault intolerant. For example, the power on may start in a faulted state. In the event of a power on condition, the system may start in a faulted state requiring a reset input to transition into a normal operating state. This may facilitate fault intolerance because a power on condition may cause sensors to be in an unknown state.

A second provision may correspond with sensor 1 active transition sensing from 0 to 1 value. This transition sensing may facilitate fault intolerance because the sensor may change from a 0 to a 1 value to cause a change in the state system. If the sensor was always active or inactive, no state transition may occur.

A third provision may correspond with sensor 2 active transition sensing from 0 to 1 value. This transition sensing may facilitate fault intolerance because the sensor may change from a 0 to a 1 value to cause a change in the state system. If the sensor was always active or inactive, no state transition may occur.

A fourth provision may correspond with a maximum time measurement between sensor 1 and sensor 2 active transitions. This measurement of time may facilitate fault intolerance because the sensors must transition in an expected pattern that may be difficult to reproduce if unexpected behavior was occurring in the hazardous material transition area. In addition, sensors that have faults may not likely produce the expected pattern.

A fifth provision may correspond with a maximum muting time. This measurement of time may facilitate fault intolerance because the expected pattern of behavior may be material to move out of the hazardous material transition area in an expected amount of time. In addition, sensors that have faults may not likely produce the expected pattern.

A sixth provision may correspond with the safety sensors providing an overall protection. In the event of muting feature fault, the safety protection system may operate normally by detecting an authorized entry into the hazardous area.

In some examples, the two sensor light curtain muting (TSLCM) AOI may differ from conventional systems or sensors (e.g., a two-sensor Asymmetrical Muting (TSAM)) in several ways. For example, the TSLCM AOI may operates in manual mode that requires a reset after power on or fault. The maximum time between sensor 1 and 2 transitions may not be disabled. There may be no maximum time measurement between enabling the muting feature and the safety sensor input becoming inactive. The maximum muting time can be set to a time longer than 3600 ms and cannot be disabled. In some examples, the system may correspond with a maximum muting time of 180000 ms. The maximum muting time can be reset with a transition from inactive to active of the ResetMaximumTime Boolean input. In some examples, there may be no override feature to activate the output. Sensor 2 can become inactive and active again, provided that the transition time may be within the maximum time between sensor 1 and sensor 2 transition time. While sensor 2 is inactive, the muting feature may be disabled. In some examples, sensor 1 and sensor 2 may be active with a value of 1 when the material is being detected by the muting sensor (active dark operation).

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system comprising:
 a mobile drive unit configured to autonomously move in a fulfillment center, the mobile drive unit associated with a height and a width of the mobile drive unit that are stored with a first specification of the mobile drive unit in a data store;

a robotic arm configured to pack and stow items moved by the mobile drive unit within the fulfillment center;

a plurality of sensors mounted in association with the robotic arm, locations of the plurality of sensors corresponding to the height or the width of the mobile drive unit, and the plurality of sensors being affixed at the locations in association with the robotic arm; and a management module communicatively coupled with the mobile drive unit, the robotic arm, and the plurality of sensors, and configured to:

receive, from the plurality of sensors, sensor data in a detection space of the fulfillment center, and the detection space being adjacent to the robotic arm;

determine that an object has entered the detection space based at least in part on the sensor data;

determine that at least one of the plurality of sensors has changed a state in association with the object entering the detection space;

compare the sensor data received from the locations of the plurality of sensors with the specification of the mobile drive unit;

determine that a second specification of the object corresponds with the first specification of the mobile drive unit; and when the second specification of the object is identified as the mobile drive unit based at least in part on the first specification and the changed state of the at least one of the plurality of sensors, deactivate protection rules associated with the robotic arm.

2. The inventory management system of claim 1, wherein the protection rules stop movement of the robotic arm or reduce a speed of the robotic arm.

3. The inventory management system of claim 1, the management module further configured to:

when the second specification of the object does not correspond with the first specification of the mobile drive unit, determine that the object is a human operator; and stop movement or reduce a speed of the movement of the robotic arm based at least in part on the determination that the object is the human operator.

4. The inventory management system of claim 1, wherein the protection rules comply with ISO 13855.

5. A computer system comprising:

a mobile drive unit configured to autonomously move in a fulfillment center;

a robotic arm configured to pack and stow items moved by the mobile drive unit within the fulfillment center;

a plurality of sensors mounted in association with the robotic arm; and a management module communicatively coupled with the mobile drive unit and the plurality of sensors and configured to:

receive, from the plurality of sensors, sensor data in a detection space of the fulfillment center, and the detection space being adjacent to the robotic arm;

determine that an object has entered the detection space based at least in part on the sensor data;

determine that at least one of the plurality of sensors has changed a state in association with the object entering the detection space; and when the object is identified as the mobile drive unit based at least in part on the changed state of the at least one of the plurality of sensors, deactivate protection rules associated with the robotic arm.

6. The computer system of claim 5, wherein the mobile drive unit or an inventory holder carried by the mobile drive unit is associated with a height and a width that are stored with a specification, wherein locations of the plurality of sensors correspond to the height or the width of the mobile drive unit or the inventory holder, and the sensor data identifies a detection of the object received from the locations of the plurality of sensors.

7. The computer system of claim 5, wherein the plurality of sensors further comprise:

at least one muting sensor affixed in association with the robotic arm, the muting sensor being configured to temporarily and automatically suspend a safety function of the robotic arm due a non-hazardous portion of movement of the mobile drive unit; and at least one distance sensor affixed in association with the robotic arm, the distance sensor configured to measure a distance in a three-dimensional plane from a mount point adjacent to the robotic arm and toward the detection space.

8. The computer system of claim 5, wherein the plurality of sensors comprise at least a first sensor and a second sensor, and the first sensor is active while the second sensor is inactive, and the first sensor and the second sensor operate asynchronously.

9. The computer system of claim 5, wherein the sensor data comprises first sensor data and second sensor data, and wherein the management module is further configured to:

receive the first sensor data in the detection space, the first sensor data identifying a first location of the object;

receive the second sensor data in the detection space, the second sensor data identifying a second location of the object;

compare the first location of the object and the second location of the object;

determine that the object is moving toward the robotic arm; and adjust an operation of the robotic arm based at least in part on the determination.

10. The computer system of claim 9, wherein the management module is further configured to:

compare a first width of the object with a second width of the mobile drive unit; and when the first width matches the second width, determine that the mobile drive unit is moving toward the robotic arm.

11. The computer system of claim 9, wherein the management module is further configured to:

compare a first height of the object with a second height of a base of an inventory holder being held by the mobile drive unit; and when the first height matches the second height, determine that the mobile drive unit carrying the inventory holder is moving toward the robotic arm.

12. The computer system of claim 11, wherein a specification of the inventory holder is unique in comparison to a human specification corresponding with a human height or a human width.

13. A computer-implemented method, comprising:

receiving, by a computing system from a plurality of sensors, sensor data in a detection space, and the detection space being adjacent to a robotic arm and the plurality of sensors;

determining, by the computing system, that an object has entered the detection space based at least in part on the sensor data;

determining, by the computing system, that at least one of the plurality of sensors has changed a state in association with the object entering the detection space; and when the object is identified as a mobile drive unit configured to autonomously move in the detection space based at least in part on the changed state of the at least one of the plurality of sensors, deactivating, by the computing system, protection rules associated with the robotic arm.

14. The computer-implemented method of claim 13, wherein the detection space comprises a plurality of zones that are associated with activation and deactivation of the robotic arm for protection.

15. The computer-implemented method of claim 13, further comprising:
   detecting an entrance of the mobile drive unit in a first zone of the detection space;
   detecting a lateral movement of the mobile drive unit in a second zone of the detection space, the lateral movement operating with respect to the robotic arm along a surface of the detection space;
   detecting an exit of the mobile drive unit in a third zone of the detection space; and
   in response to detecting the exit, activating protection rules for the first zone, the second zone, and the third zone.

16. The computer-implemented method of claim 13, wherein the determination of the object that entered the detection space is the mobile drive unit that carries an inventory holder in the detection space.

17. The computer-implemented method of claim 13, wherein the plurality of sensors comprise at least a pair of muting sensors and a pair of photoelectric sensors, wherein the pair of muting sensors are associated with deactivating protection rules and the pair of photoelectric sensors are associated with detecting the object in the detection space.

18. The computer-implemented method of claim 13, wherein the plurality of sensors comprise at least a pair of sensors comprising a first sensor of the pair of sensors and a second sensor of the pair of sensors, and wherein the first sensor toggles activation with respect to the second sensor.

19. The computer-implemented method of claim 18, wherein the activation of the second sensor is associated with a delay value after the first sensor becomes inactive.

20. The computer-implemented method of claim 18, wherein the first sensor and the second sensor are directed to point horizontally outward with respect to the robotic arm.

* * * * *